(12) United States Patent
Shotey et al.

(10) Patent No.: US 7,071,415 B1
(45) Date of Patent: Jul. 4, 2006

(54) HORIZONTAL AND VERTICAL IN-USE ELECTRICAL DEVICE COVER

(75) Inventors: Michael J. Shotey, Scottsdale, AZ (US); Marcus J. Shotey, Scottsdale, AZ (US); Edgar W. Maltby, Mesa, AZ (US); John Kinnard, Queen Creek, AZ (US); Kenneth C. Booth, Mesa, AZ (US)

(73) Assignee: Taymac Corporation, Gilbert, AZ (US)

( * ) Notice: Subject to any disclaimer, the term of this patent is extended or adjusted under 35 U.S.C. 154(b) by 0 days.

(21) Appl. No.: 11/062,030

(22) Filed: Feb. 18, 2005

Related U.S. Application Data

(60) Provisional application No. 60/546,837, filed on Feb. 19, 2004, provisional application No. 60/567,378, filed on Apr. 30, 2004, provisional application No. 60/592,567, filed on Jul. 30, 2004, provisional application No. 60/609,921, filed on Sep. 14, 2004.

(51) Int. Cl.
*H02G 3/14* (2006.01)
(52) U.S. Cl. .......................... 174/67; 174/66; 220/241
(58) Field of Classification Search ................. 174/66, 174/67; 220/241, 242; D8/353, 350; D13/177; 200/333
See application file for complete search history.

(56) References Cited

U.S. PATENT DOCUMENTS

| 872,694 A | 12/1907 | Thiem |
|---|---|---|
| 932,601 A | 8/1909 | Corbett |
| 1,608,621 A | 11/1926 | Sachs |
| 1,784,277 A | 12/1930 | Darlington |
| 1,952,719 A | 3/1934 | Lewin |
| 2,240,187 A | 4/1941 | Kingdon et al. |
| 2,526,606 A | 10/1950 | Hendrick |
| 2,916,733 A | 12/1959 | Hirsch |
| 3,252,611 A | 5/1966 | Weitzman et al. |
| 3,432,611 A | 3/1969 | Gaines |
| 3,437,738 A | 4/1969 | Wagner |
| 3,438,534 A | 4/1969 | Zerwes |
| 3,439,534 A | 4/1969 | Zerwes |
| 3,491,327 A | 1/1970 | Tait et al. |
| 3,518,356 A | 6/1970 | Friedman |
| 3,530,230 A | 9/1970 | Cormier |

(Continued)

FOREIGN PATENT DOCUMENTS

GB 326377 3/1930

OTHER PUBLICATIONS

Pass & Seymour, "TradeMaster Weatherproof While-in-Use-Covers", Apr., 1999, Catalog No. WIUC20C. 34 UL 514 C-38, Dec. 26, 1996., pp. 34-55.

*Primary Examiner*—Dhiru R. Patel
(74) *Attorney, Agent, or Firm*—Booth Udall, PLC

(57) ABSTRACT

A plurality of approaches for forming a horizontal and vertical electrical device cover including 1) providing hinge members on opposing sides of the cover that allow the cover to pivot along adjacent-sided axes for horizontal and vertical mounting; 2) providing a removable pin and corresponding cover and base hinge members wherein the removable pin may be placed along either the horizontal or vertical axis for selective horizontal or vertical mounting; 3) providing a pivoting hinge arm that is pivotable between adjacent sides of the unit for selective horizontal or vertical mounting; and 4) providing selectively attachable hinge members that may be attached by the installer at the time of installation to choose between horizontal or vertical mounting configurations.

20 Claims, 36 Drawing Sheets

U.S. PATENT DOCUMENTS

| | | |
|---|---|---|
| 3,544,703 A | 12/1970 | Jones |
| 3,564,112 A | 2/1971 | Algotsson et al. |
| 3,654,663 A | 4/1972 | Algotsson |
| 3,690,035 A | 9/1972 | Schindlauer |
| 3,895,179 A | 7/1975 | Wyatt |
| 3,965,287 A | 6/1976 | Mueller |
| 4,032,030 A | 6/1977 | Bass |
| 4,197,959 A | 4/1980 | Kramer |
| 4,342,493 A | 8/1982 | Grenell |
| 4,424,407 A | 1/1984 | Barbic |
| 4,500,746 A | 2/1985 | Meehan |
| 4,705,335 A | 11/1987 | Goebel |
| 4,737,599 A | 4/1988 | Fontaine |
| 4,757,908 A | 7/1988 | Medlin, Sr. |
| 4,833,277 A | 5/1989 | Jacoby |
| 4,844,275 A | 7/1989 | Schnell et al. |
| 4,979,634 A | 12/1990 | Begley |
| 4,998,635 A | 3/1991 | Vink et al. |
| 5,072,848 A | 12/1991 | Pipis et al. |
| 5,076,641 A | 12/1991 | Lindberg |
| 5,178,350 A | 1/1993 | Vink et al. |
| 5,218,169 A | 6/1993 | Riceman |
| 5,280,135 A | 1/1994 | Berlin et al. |
| 5,362,924 A | 11/1994 | Correnti |
| 5,527,993 A | 6/1996 | Shotey et al. |
| 5,556,289 A | 9/1996 | Holbrook |
| 5,763,831 A | 6/1998 | Shotey et al. |
| 6,160,219 A | 12/2000 | Maltby et al. |
| 6,476,321 B1 | 11/2002 | Shotey et al. |
| 2005/0082081 A1* | 4/2005 | Marcou et al. ............ 174/67 |

* cited by examiner

HORIZONTAL AND VERTICAL IN-USE ELECTRICAL DEVICE COVER

RELATED APPLICATIONS

This application claims priority to the following, the disclosures of which are each hereby incorporated herein by reference: U.S. Provisional Patent Application to Michael J. Shotey, et al entitled "Outlet Cover with Snap-on Hinges," Ser. No. 60/546,837, filed Feb. 19, 2004; U.S. Provisional Application to Michael J. Shotey, et al entitled "Horizontal and Vertical In-use Electrical Outlet Cover," Ser. No. 60/567,378, filed on Apr. 30, 2004; U.S. Provisional Application to Michael J. Shotey, et al entitled "Horizontal and Vertical In-use Electrical Outlet Cover with Pin Hinge," Ser. No. 60/592,567, filed on Jul. 30, 2004; and U.S. Provisional Application to Michael J. Shotey, et al entitled "Horizontal and Vertical In-use Electrical Outlet Cover with Pivoting Hinge Element," Ser. No. 60/609,921, filed on Sep. 14, 2004.

BACKGROUND OF THE INVENTION

1. Technical Field

This invention generally relates to a horizontal or vertical mountable cover for an electrical device and specifically to an electrical device cover that is selectively mountable in either a horizontal or a vertical mountable configuration. Specific hinge types disclosed include hinge members on adjacent sides, hinge members on non-adjacent sides, hinge members that pivot between adjacent sides, and selectively attachable hinge members.

2. Background Art

Household electrical devices are often situated in outdoor locations to permit plugging in various outdoor appliances, such as electric weed trimmers, sprinkler systems and outdoor lighting, or controlling outdoor electrical components. These outdoor electrical devices are significantly more vulnerable to contamination from dirt, water and other foreign matter than electrical devices located indoors. As a result, outdoor electrical devices are usually provided with some type of protective cover for preventing the entry of contaminants.

Assemblies for covers have been proposed for various electrical device configurations. Some assemblies support a single configuration while others have a fixed set of hinges that support multiple configurations. Several examples of hinge configurations known in the art are shown and described in U.S. Pat. Nos. 4,988,832, 5,527,993, 5,763,831, 6,127,630, 6,133,531, 6,420,653 B1, 6,441,307 B1, and 6,476,321 B1, and United States Patent Application Publication US 2002/0104674 A1, the disclosures of which are hereby incorporated herein by reference.

One common type of outdoor cover is a flat metal cover that includes a spring biased metal plate that is hingedly connected to a base of the outlet cover that pivots from a closed position covering and tightly sealing the plug receptacles to an open position allowing access to the receptacles. In some cases electrical outlet includes a single plate with a number of plug receptacles disposed therein. In other cases, a plurality of hinged plates is provided, each plate corresponding to a different one of the receptacles to permit each receptacle to be covered and uncovered independently.

A major problem with flat electrical outlet covers is that the hinged lids provide protection only while the receptacles are not in use. As soon as a lid is swung open to allow an electrical appliance to be plugged into a receptacle, that receptacle is open to the elements and vulnerable to damage from moisture and the like.

Various while-in-use outlet covers are also available for mounting in weather-exposed areas. One such while-in-use cover is shown and described in U.S. Pat. No. 5,763,831 to Shotey, et al. The while-in-use cover originally disclosed in U.S. Pat. No. 5,763,831 includes hinge members on adjacent sides that allow for pivoting the cover about either of the two adjacent sides by attaching the cover and base hinge members corresponding to the selected side.

Electrical outlet covers of the past include devices having more than one mounting orientation with lids that may be selectively disposed on one of a variety of hinges on distinct axes. These devices have conventional hinges that typically include rigid hinge pins for connecting the lids to the base plates.

DISCLOSURE OF THE INVENTION

Embodiments of the present invention may be readily adapted to a variety of outlet cover assemblies, outlet cover assembly materials and methods of creating outlet cover assemblies. Embodiments of the present invention may provide a sleeker outlet cover, a more space efficient outlet cover and a smaller outlet cover, among other benefits.

Embodiments of the present outlet cover assembly include a base and a lid that can be selectively mounted to the base in a way that allows the lid to pivot about either of at least two different axes. Particular embodiments of the invention allow the lid to be mounted on the base to pivot two directions substantially perpendicular to each other. For while-in-use, weather exposed conditions, both the base and the lid maybe formed of a rugged, waterproof, corrosion resistant and electrically nonconductive material. The base is generally substantially planar and has at least one mounting screw aperture and at least one socket face aperture, or socket prong aperture set, for the electrical outlet. Plugs with conventional electrical cords mounted in the receptacles of the electrical outlet may be enclosed by the lid while in use with the lid closed against the base. One or more slots or openings may be formed through the wall of the lid to allow the cords of the installed plugs to extend from within the lid. The lid maybe releasably held in a closed position over the base by a latching mechanism.

Specific approaches to accomplishing the function of allowing the outlet cover to be mounted in a way so as to permit mounting of the cover unit in either vertical or horizontal orientation include: 1) providing hinge members on opposing sides of the cover that allow the cover to pivot along adjacent-sided axes for horizontal and vertical mounting; 2) provision of a removable pin and corresponding cover and base hinge members wherein the removable pin may be placed along either the horizontal or vertical axis for selective horizontal or vertical mounting; 3) provision of a pivoting hinge arm that is pivotable between adjacent sides of the unit for selective horizontal or vertical mounting; and 4) selectively attachable hinge members that may be attached by the installer at the time of installation to choose between horizontal or vertical mounting configurations.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings.

DESCRIPTION OF THE INVENTION

It will be understood by those of ordinary skill in the art that the invention is not limited to the specific components and assembly procedures disclosed herein. Many additional components and assembly procedures known in the art consistent with the intended electrical outlet cover assembly and/or assembly procedures for an electrical outlet cover assembly will become apparent for use with embodiments of the present invention from the disclosure herein. Accordingly, for example, although particular hardware is disclosed, such hardware and implementing components may comprise any shape, size, style, type, model, version, measurement, concentration, material, quantity, and/or the like as is known in the art for such hardware and implementing components, consistent with the intended operation of assembling an electrical outlet cover assembly. It will also be understood by those of ordinary skill in the art that the invention is not limited to use of any specific components, provided that the components selected are consistent with the intended electrical outlet cover assembly and/or method of assembling an electrical outlet cover assembly.

This disclosure includes a plurality of embodiments for each of a variety of approaches for enabling a weather proof, while-in-use electrical outlet cover to be configured so that one unit may be mounted either horizontally or vertically at the installer's option. It will be clear to those of ordinary skill in the art that various aspects of the present invention apply equally to outlet covers that are not while-in-use covers and that although the examples provided herein are given in relation to while-in-use covers, the disclosure and claims are intended to apply more broadly to electrical outlets with covers hingedly attached.

For each of the examples provided herein, the installer can choose at the time of installation of a cover unit whether a vertical-mount or a horizontal-mount outlet box is needed and can, at the time of installation, convert the box to the appropriate orientation configuration if change is needed. Rather than ordering, tracking and carrying separate units for both horizontal and vertical mounting, a single unit can be used for both.

Four general approaches to this concept are included herein and will each be addressed separately. Although the general concepts differ in some respects, there are also many similarities between the different approaches. Like numbers are used herein between the different examples and approaches to refer to like-structured and/or like-functioning components.

The First Approach: Opposing Side Hinge Members

Figure 1:
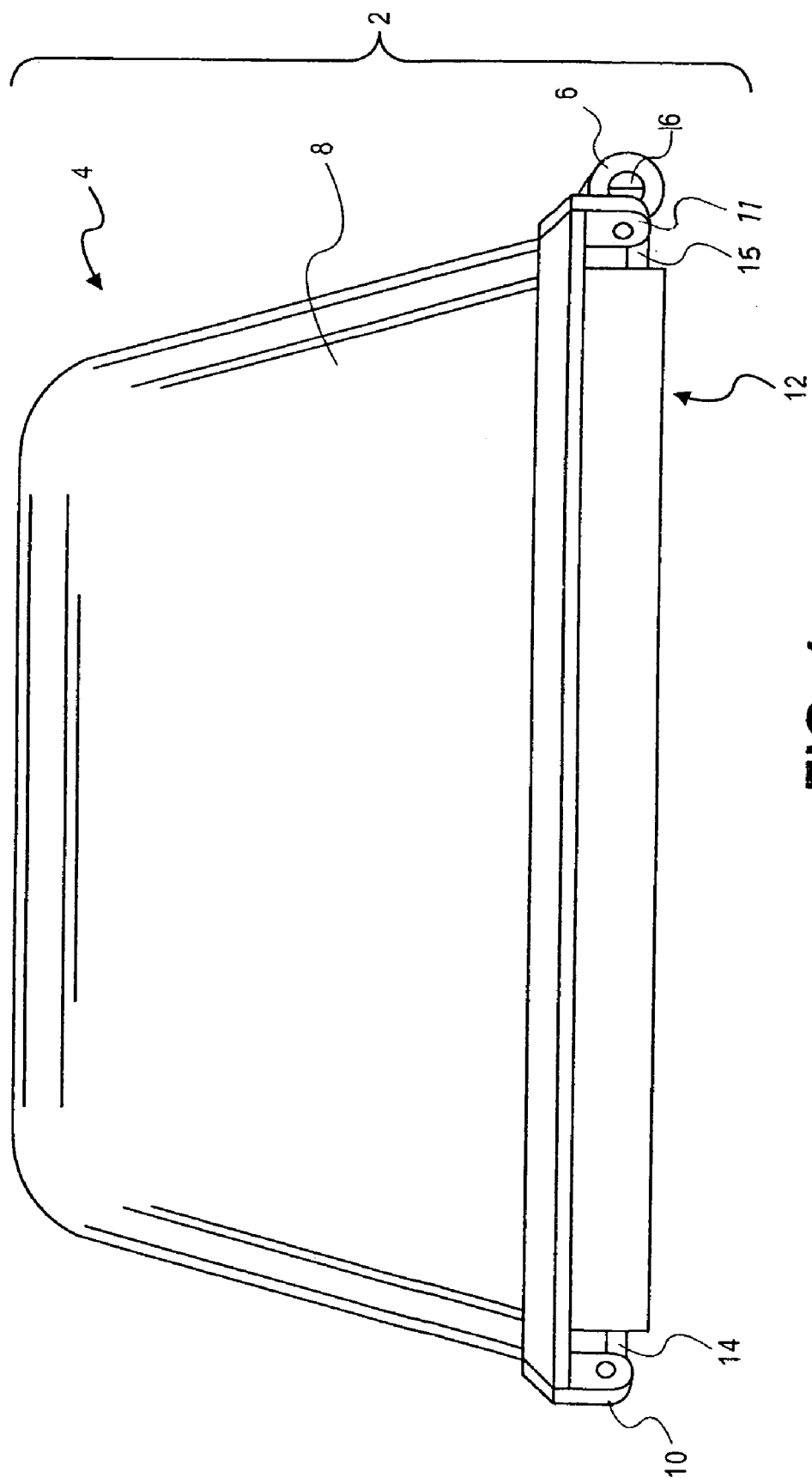
FIG. 1 is a side view of an electrical outlet cover assembly configured according to an embodiment of a first approach.
Figure 2:
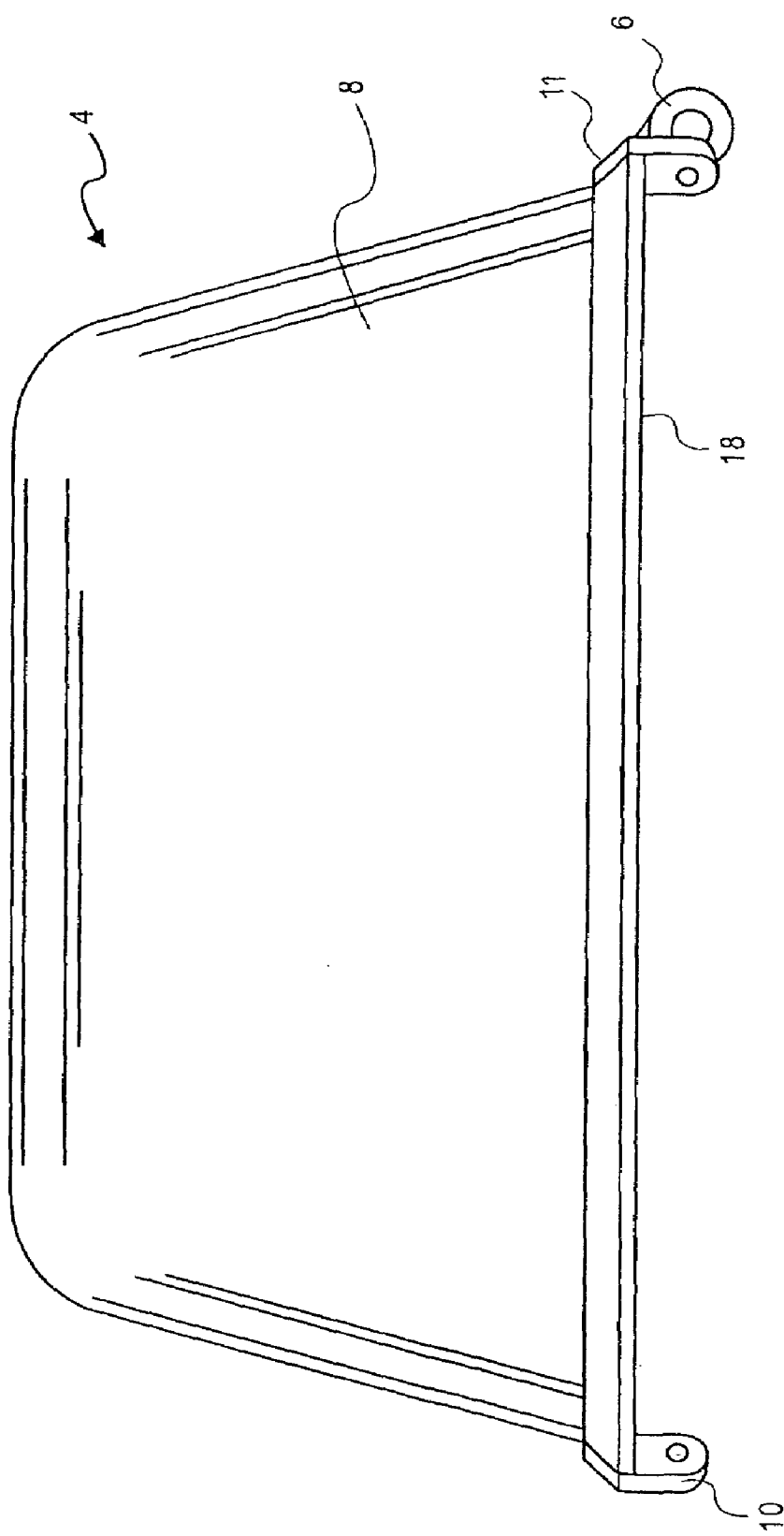
FIG. 2 is a side view of a lid of an electrical outlet cover assembly configured according to an embodiment of the first approach.
Figure 3:
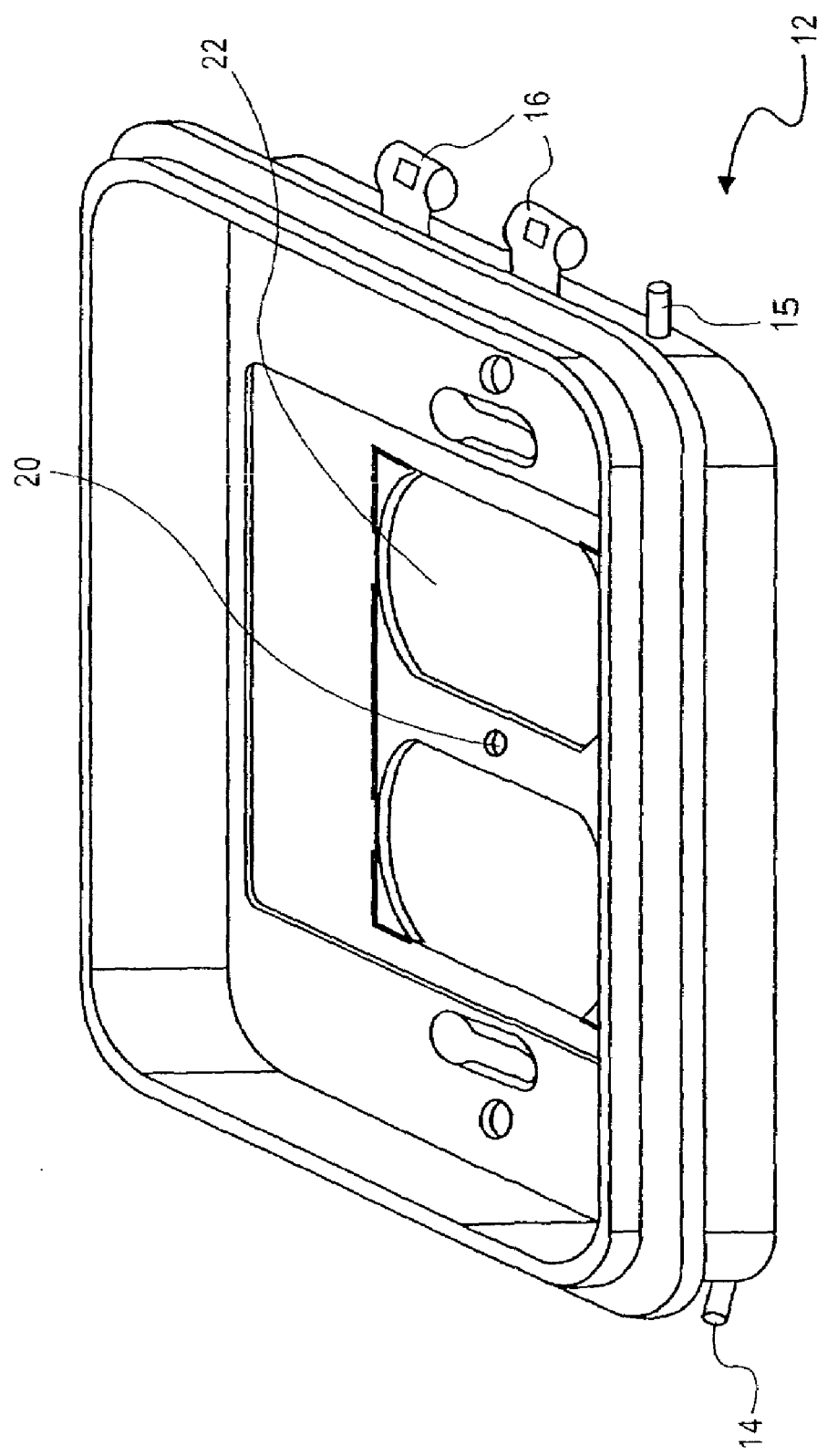
FIG. 3 is a perspective view of a base of an electrical outlet cover assembly configured according to an embodiment of the first approach.

As illustrated in FIGS. 1–3, the first approach generally relates to an electrical outlet cover assembly 2 consisting of a lid 4 and a base 12. FIG. 2 shows a lid 4 separate from the base. The lid 4 may be a box-like structure 8 with an open back side 18. The lid 4 includes hinge members 6 and 10–11 that selectively mate with other hinge members 14–15 and 16 on the base 12 to hingedly attach the lid 4 to the base 12. The hinge members 6 and 10 allow the lid 4 to be attached to the base 12 so that the lid 4 pivots about a first axis parallel to the short side of the lid 4 shown in FIG. 1 or the longer side of the lid 4 of FIG. 1. This dual hinging involves at least two mating sets of hinge members (6 and 16, and 10–11 and 14–15). Each set of hinge members 6 and 16, and 10–11 and 14–15, when the lid 4 is attached to the base 12 by one of the sets, causes the lid to pivot about a different axis.

Figure 4:
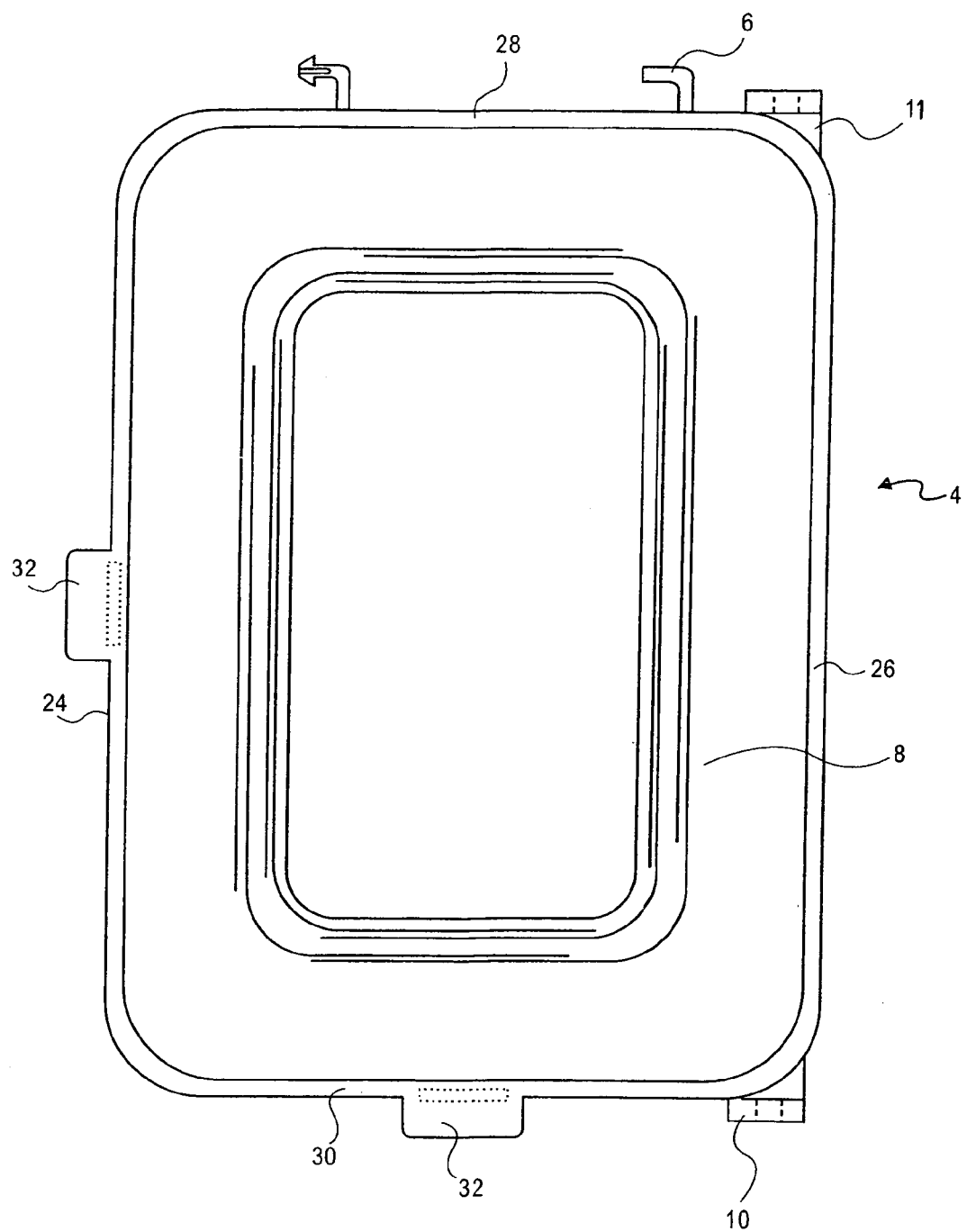
FIG. 4 is a front view of a lid of an electrical outlet cover assembly configured according to an embodiment of the first approach.
Figure 5:
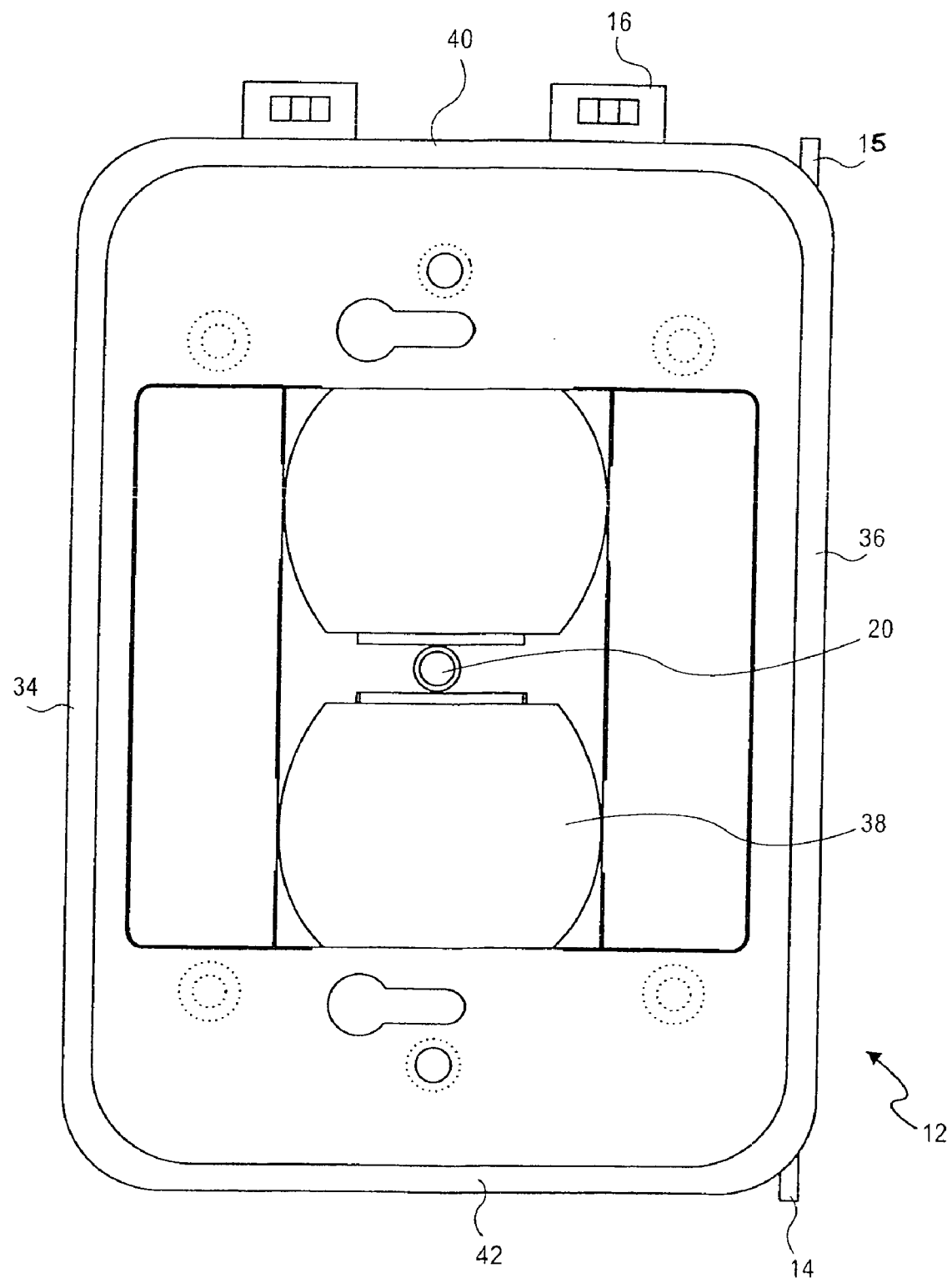
FIG. 5 is a front view of a base of an electrical outlet cover assembly configured according to an embodiment of the invention.

The lid hinge members 6 and 10–11 may be arranged to allow the electrical outlet cover assembly 2 to fit into small or narrow mounting spaces in this embodiment because there are no hinge members protruding from two opposing sides 24 and 26 (lid) and 34 and 36 (base) (FIGS. 4 and 5).

For this particular embodiment, the lid hinge members 6 and 10 are attached to the lid 4 on two nonadjacent sides 28 and 30 of the lid 4. This leaves the other two nonadjacent sides 24 and 26 of the lid 4 free of any extending hinge members that might interfere with a narrow opening or otherwise increase the dimensions of the cover assembly in that direction. As illustrated by the hinge styles in FIGS. 2 and 3, the specific hinge components 6 and 10–11, and 14–15 and 16, on the lid and base are not required so long as they mate with the corresponding hinge member type.

With reference to FIGS. 4 and 5, the lid hinge members 6 and 10–11 may be arranged as follows in an embodiment of the present invention. Two hinge members 6, or a first set of hinge members, may be aligned along one side 28 of the lid 4. These hinge members 6 are placed so that they will mate with two hinge members 16 on an edge 40 of the base 12 and form hinges. These hinge members 6 may be of any type or style of hinge assembly that can be used to form a selectively attachable hinge. One example of a selectively attachable hinge member is a pin 6 or male attachment with a 90-degree bend. Lid pin hinge member 6 mates with a base housing hinge member 16, which is sometimes called a barrel hinge member. When the lid pin 6 mates with the barrel hinge member 16 a hinge is formed that allows the lid 4 to pivot open and closed over the base 12 by pivoting about an axis substantially parallel to a side 40 of the base 12.

Figure 8:
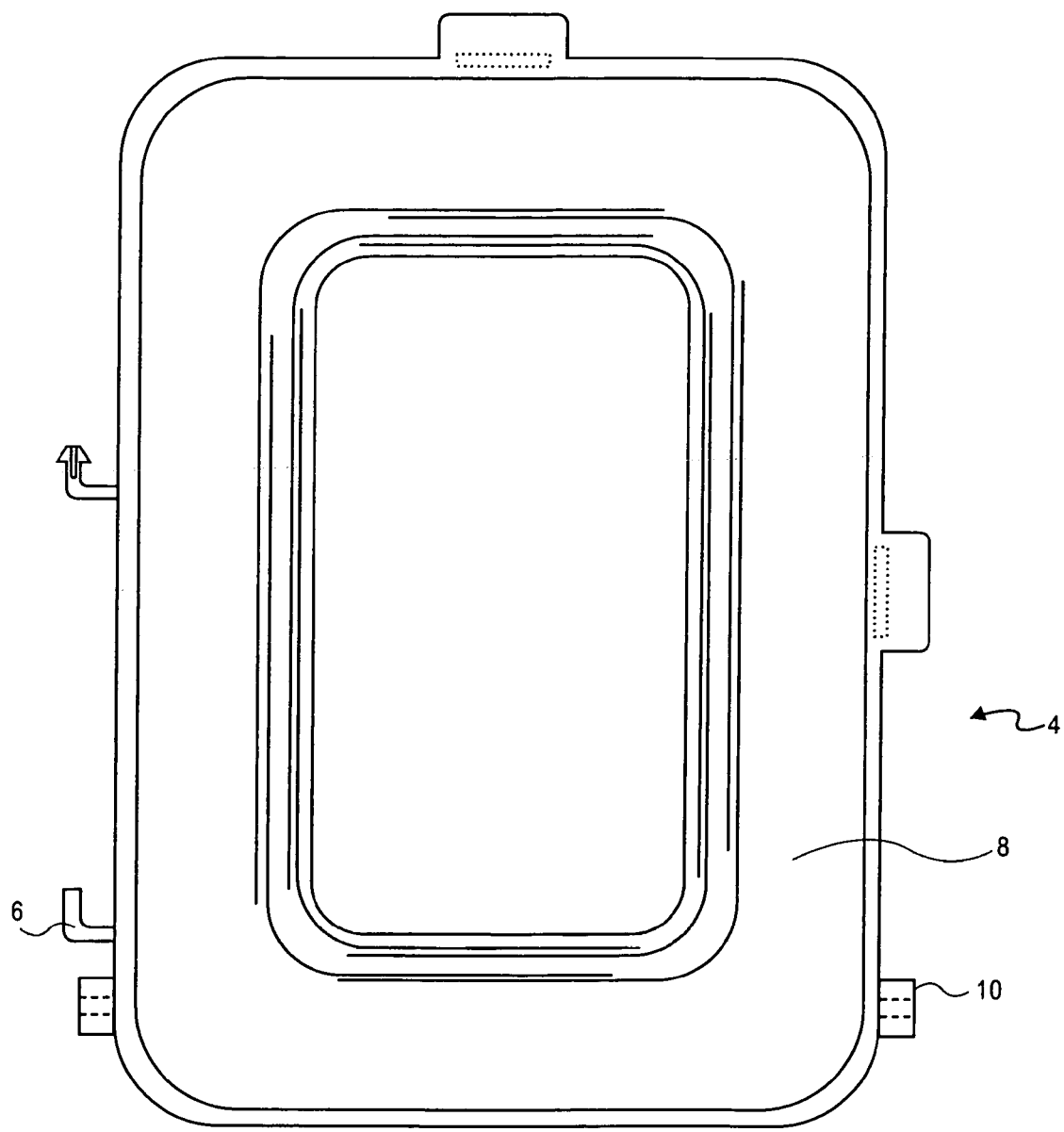
FIG. 8 is a front view of a lid of an electrical outlet cover assembly configured according to an embodiment of the first approach.

A second set of lid hinge members 10 and 11 is arranged with one hinge member 111 on the side 28 of the lid 4 to which the first set of hinge members 6 are attached. The other hinge member 10 is attached to a nonadjacent side 30 of the lid 4, in this case the opposite side 30. When these hinge members 10 and 11 mate with the matching base hinge members 14 and 15 on the base 12, the lid 4 is allowed to pivot about an axis substantially parallel to a different side 36 of the base 12. As shown in FIG. 8, hinge members 10 and 11 may be placed a significant distance from the edge of the lid 4 and do not necessarily need to be placed immediately on an edge of the lid 4. Those of ordinary skill in the art will readily understand the lid design changes needed to allow the lid to pivot upon the base with the hinge position changed.

The hinge members 10 and 11 may be many different types of hinge members. The only requirement is that the hinges formed from the hinge members 10 and 11 allow pivoting along the edge of the lid 4. One example of possible hinge members 10 and 11 is an extension from the lid 4 with a hole that is designed to receive the base hinge member 14 and 15, shaped as a pin as in FIG. 3. In this example, the base hinge member 14 and 15 would be attached to the base 12. When the base hinge members 14 and 15 on the base 12 are placed in the holes on the hinge members 10 and 11 on the lid 4, a hinge is formed that allows the lid 4 to pivot about the edge 36 of the base 12.

The lid 4 is adapted to close over the electrical outlet and any plugs that are in the outlet; protecting the outlet and the plugs from the weather. The lid 4 also may include slots or knock outs where the lid 4 material may be removed in order to allow the electrical cords of installed plugs to pass through the lid 4. An example of how these knock out tabs may be implemented and manufactured is shown and described in U.S. Pat. No. 6,441,307 to Shotey et al. and U.S. Pat. No. 6,642,453 to Shotey et al., the disclosures of which are hereby incorporated herein by reference. These knock out tabs are areas on the lid 4 where a groove or other area of thinned lid material is formed such that it can be removed. This outline allows the user to pop out a slot in the lid 4. The electrical cords of the installed plugs are then passed through the open slots or knockouts. This allows the lid 4 to be closed when the outlet is in use. Selectively attachable and detachable pieces are also contemplated for the cord slots to allow a user to replace the tabs after removing them. The lid 4 may be releasably held in a closed position over the base 12 by a latching mechanism known in the art.

The lid 4 has a lip designed to mate with a lip on the base 12. These lips help to keep fluids from entering between the lid 4 and the base 12. The lip on the lid 4 may be an indentation or channel designed to receive an edge of the base 12, or it may be any other design that provides a fluid deterrent between the lid 4 and the base 12 when the lid 4 of the electrical outlet cover assembly 2 is closed.

The lid 4 and hinge members 6 and 10–11 may be formed from any material with the strength and durability to protect the electrical outlet and plugs from weather and some level of mechanical shock. The lid 4 and hinge members 6 and 10–11 should be formed of a rugged, waterproof, corrosion resistant and electrically nonconductive material. Some form of plastic is the most common material used for while-in-use covers. The lid 4 and lid hinge members 6 and 10–11 may be formed in one piece. For instance they may be molded as a single unit. The lid 4 and lid hinge members 6 and 10–11 may also be formed in multiple pieces and assembled.

FIG. 3 is an example of a base 12 designed according to an embodiment of the present invention. The purpose of the base 12 is to provide a structure to which the lid 4 may be mounted. The base 12 may be generally planar. The base 12 generally includes openings 22 that allow access to the electrical outlet and openings 20 that allow attachment of the base 12 to the electrical outlet or mounting box. The base 12 has a lip designed to mate with a lip on the lid 4. The lip on the base 12 may be a slightly protruding edge designed to be received by a channel on the lid 4, or it may be any other design that provides a fluid deterrent between the lid 4 and the base 12 when the lid 4 of the electrical outlet cover assembly 2 is closed.

The base 12 also contains base hinge members 14–15 and 16 that are arranged to mate with the hinge members 6 and 10–11 on the lid 4. The base 12 and base hinge members 14–15 and 16 may be formed from any process or material that will provide the strength and durability required for the present invention. The base 12 and base hinge members 14–15 and 16 should be rugged, waterproof, corrosion resistant and electrically nonconductive and is generally formed of a material similar to the lid 4. The base 12 and base hinge members 14–15 and 16 may be formed in one piece, such as if the part is molded as a single part, or in multiple pieces and then assembled.

For many particular configurations of the approaches disclosed herein, one problem that may occur in a situation where there are two sets of hinge members (6 and 10–11 for instance) but only one set of hinge members is used at a time, is that the unused set of hinge members may interfere with the function of the electrical outlet cover assembly 2. This may occur if one or more unused lid hinge member bumps, catches or otherwise interferes with the corresponding unused base hinge member. For example, for the configuration shown in FIGS. 4 and 5, if the lid 4 is coupled to the base 12 using corresponding hinge members 6 and 16, the unused hinge members 10–11 and 14–15 will interfere with each other or with the opening and closing of the lid 4 if adaptations are not made to compensate.

FIGS. 4 and 5 illustrate a hinge assembly arrangement wherein the unused hinge members maybe removed in order to avoid any interference with the function of the electrical outlet cover assembly 2. The unused hinge assembly may be simply cut or broken from the lid 4 and/or the base 12 to the extent necessary to avoid interference. The hinge members may include score lines, grooves or other thinned portions to assist in removal. The draw back to this arrangement, however, is that once the unused hinge members have been removed, the lid 4 and base 12 may only be attached one way unless selectively attachable and/or detachable hinge members are provided.

Figure 6:
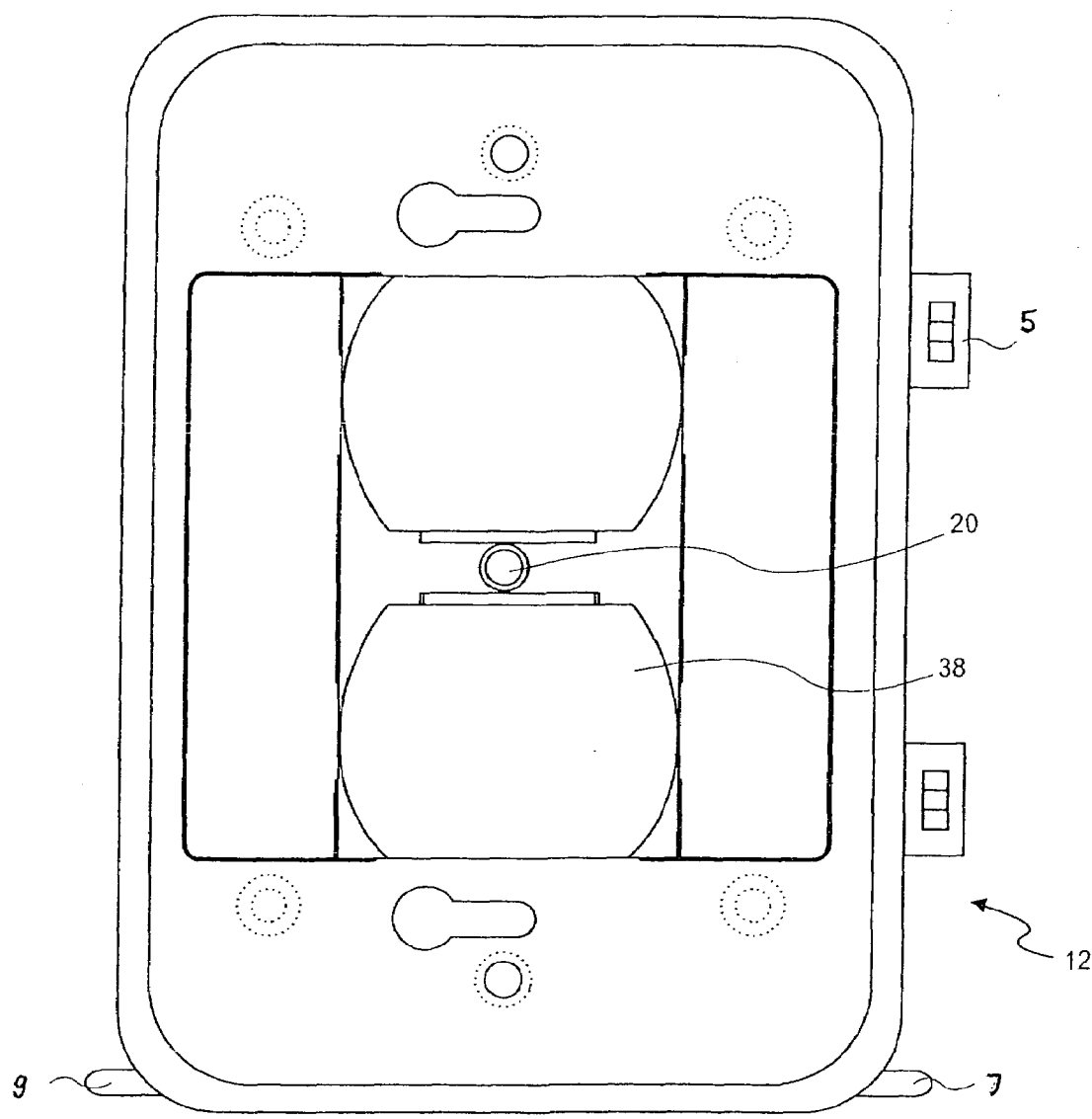
FIG. 6 is a front view of a base of an electrical outlet cover assembly configured according to an embodiment of the first approach.
Figure 7:
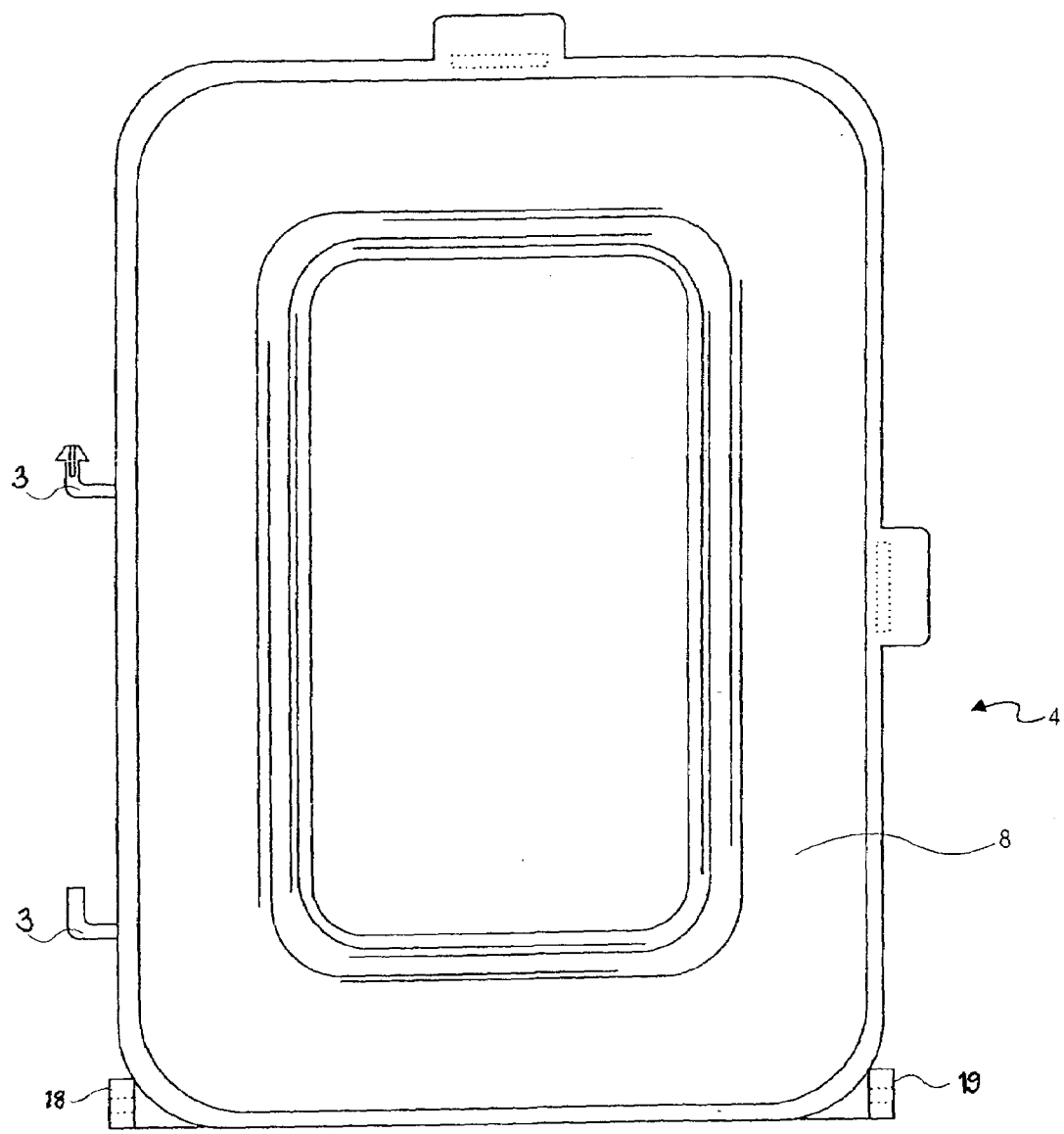
FIG. 7 is a front view of a lid of an electrical outlet cover assembly configured according to an embodiment of the first approach.

FIGS. 6 and 7 illustrate a second alternative to avoid the unused hinge members (10–11 and 14–15 for instance) interfering with the operation of the electrical outlet cover assembly 2. This arrangement provides that when one set of hinge members 3 or 18–19 on the lid 4 is attached to the mating set of hinge members 5 or 7 and 9 on the base 12, the unused set of hinge members on the lid 4 is positioned at the opposite side of the electrical outlet cover assembly 2, away from the unused set of hinge members on the base 12. In this way, the unused sets of hinge members will not interfere with each other. Slight modifications to the lid or hinge members may be necessary in certain designs to ensure the unused hinge members do not interfere with the operation of the electrical outlet cover assembly 2. Those of ordinary skill in the art will understand those changes needed for a particular design from the disclosure provided herein.

Many other arrangements may be possible that would prevent the unused sets of hinge members from interfering with the operation of the electrical outlet cover assembly 2. For instance, openings or recesses may be created in the lid 4 or base 12 in order to receive the unused sets of hinge members, without the assemblies interfering with operation of the invention.

Additional embodiments of the present invention include different configurations of apertures in the base 12 to allow access to the electrical outlet. Embodiments may include a base 12 with knock out tabs that allow the user to choose what shape and size of apertures in the base 12. This allows the base 12 to accommodate duplex, decora, GFI, round outlets or even one or more switches. It is also possible that the base 12 could secure an adapter plate to the electrical outlet. The adapter plate would provide different size and shape apertures in order to allow access to different size and shape electrical outlets. Other embodiments of the present invention may involve different shaped bases 12 and lids 4, depending on the shape of the electrical outlet to be covered. For instance, a square base 12 may be required to cover a double-gang outlet or switch.

Examples and embodiments of particular hinge member selection on the base 12 and the lid 4 in this disclosure for this and other approaches are for example purposes only. It should be understood that the hinge members of the examples may be swapped or replaced by other functioning hinge members or configurations without departing from the scope or spirit of the invention.

The Second Approach: Selectively Placeable Pin

Figure 9:
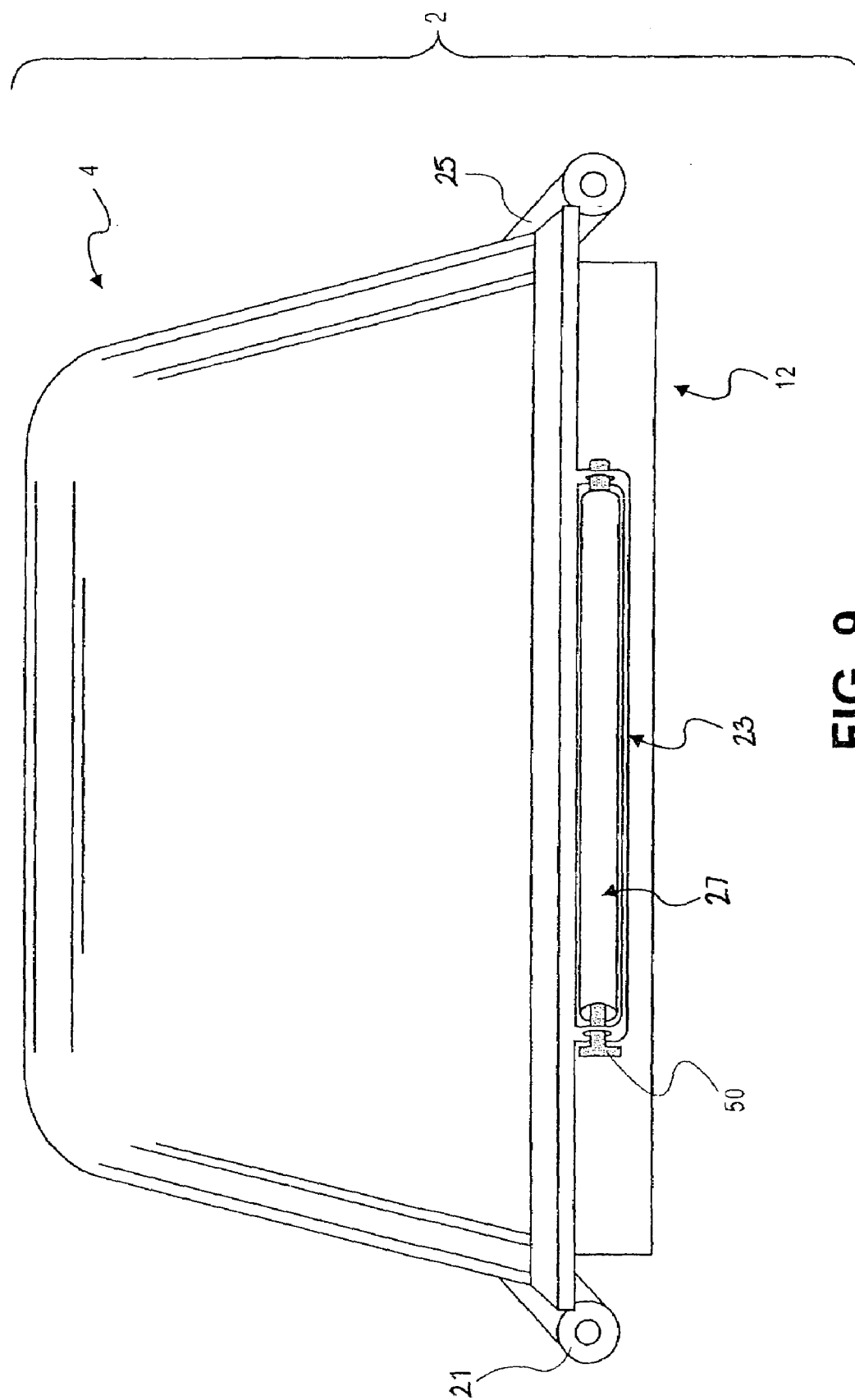
FIG. 9 is a side view of an electrical outlet cover assembly configured according to an embodiment of a second approach.
Figure 10:
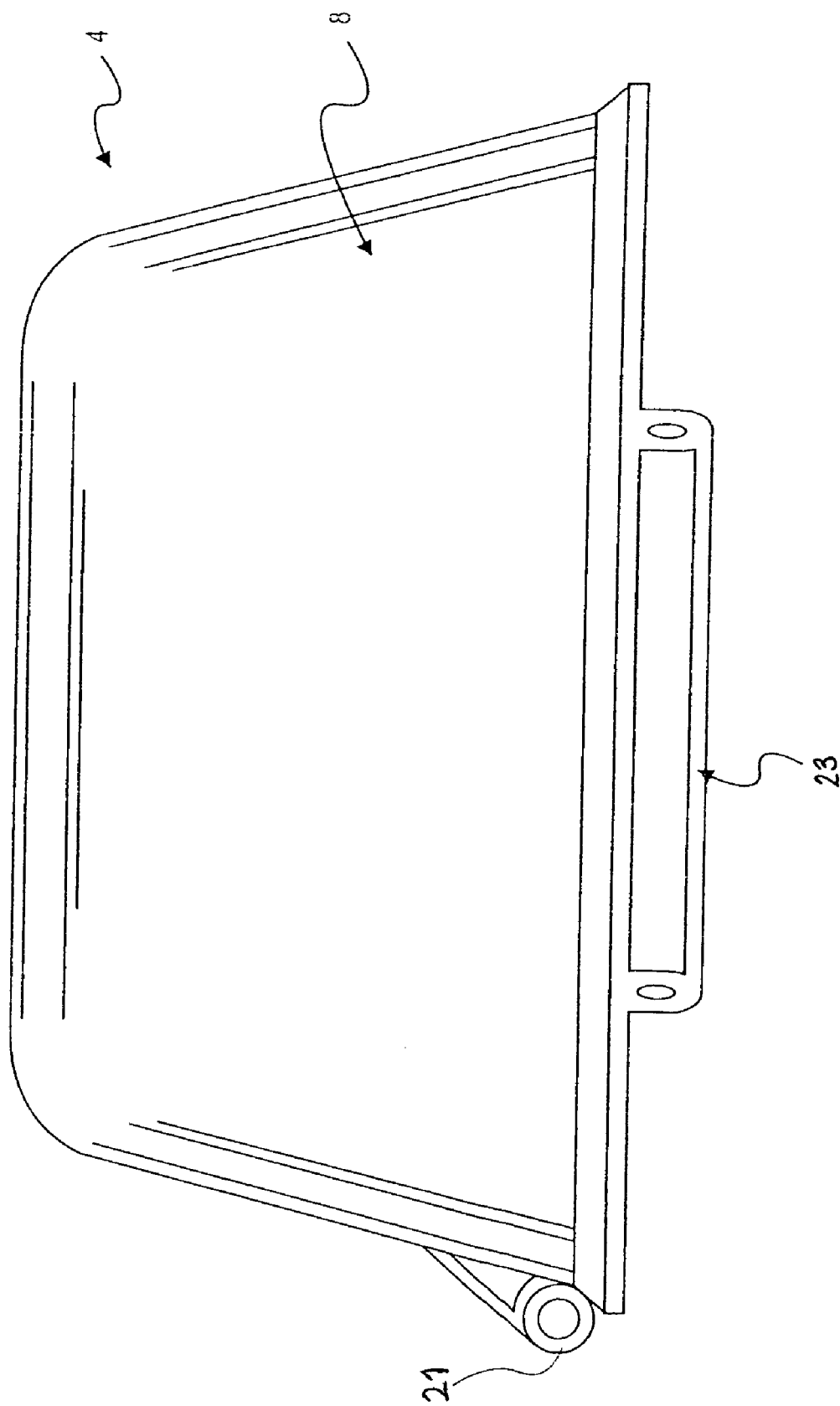
FIG. 10 is a side view of a lid of an electrical outlet cover assembly configured according to an embodiment of the second approach.
Figure 11:
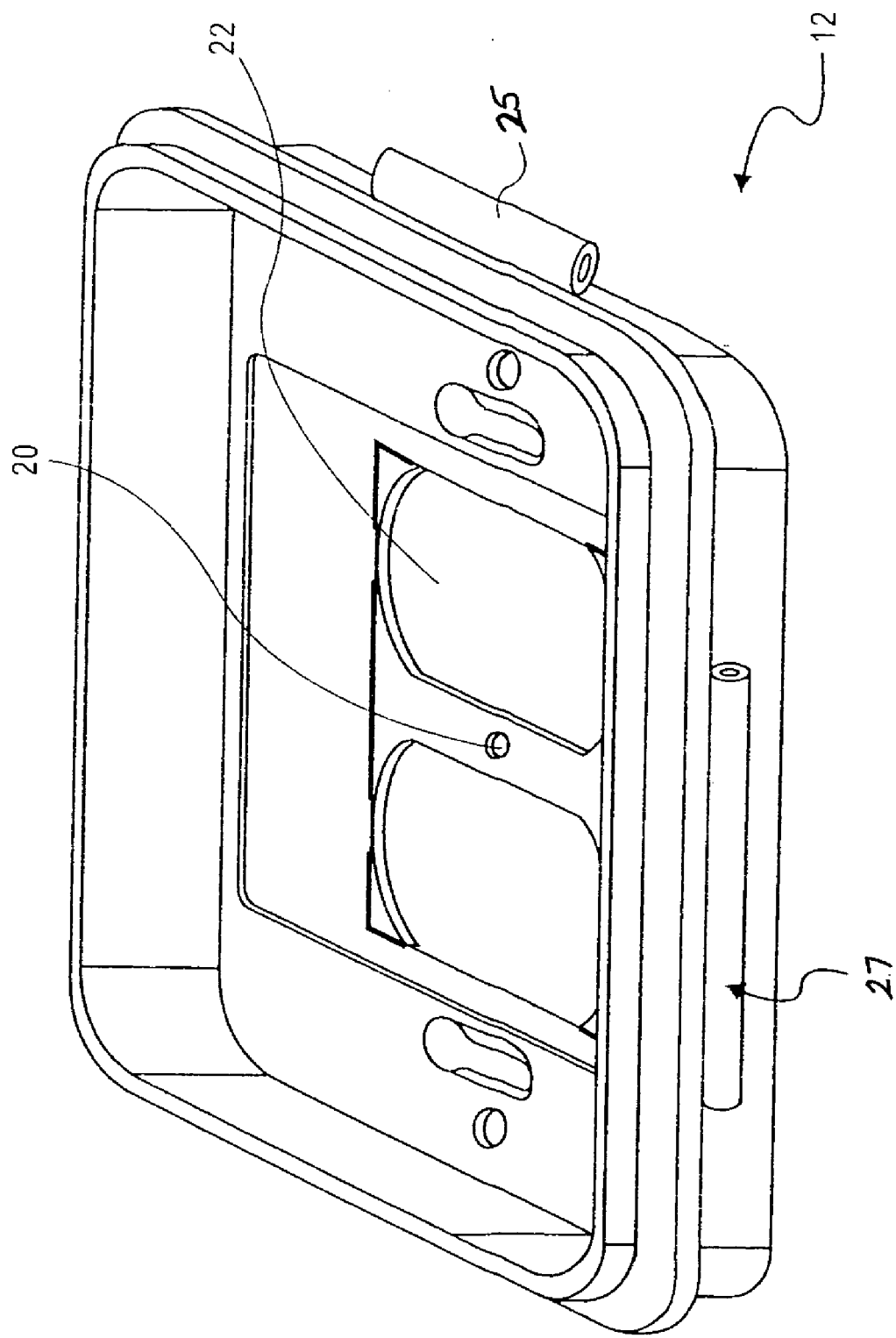
FIG. 11 is a perspective view of a base of an electrical outlet cover assembly configured according to an embodiment of the second approach.
Figure 13:
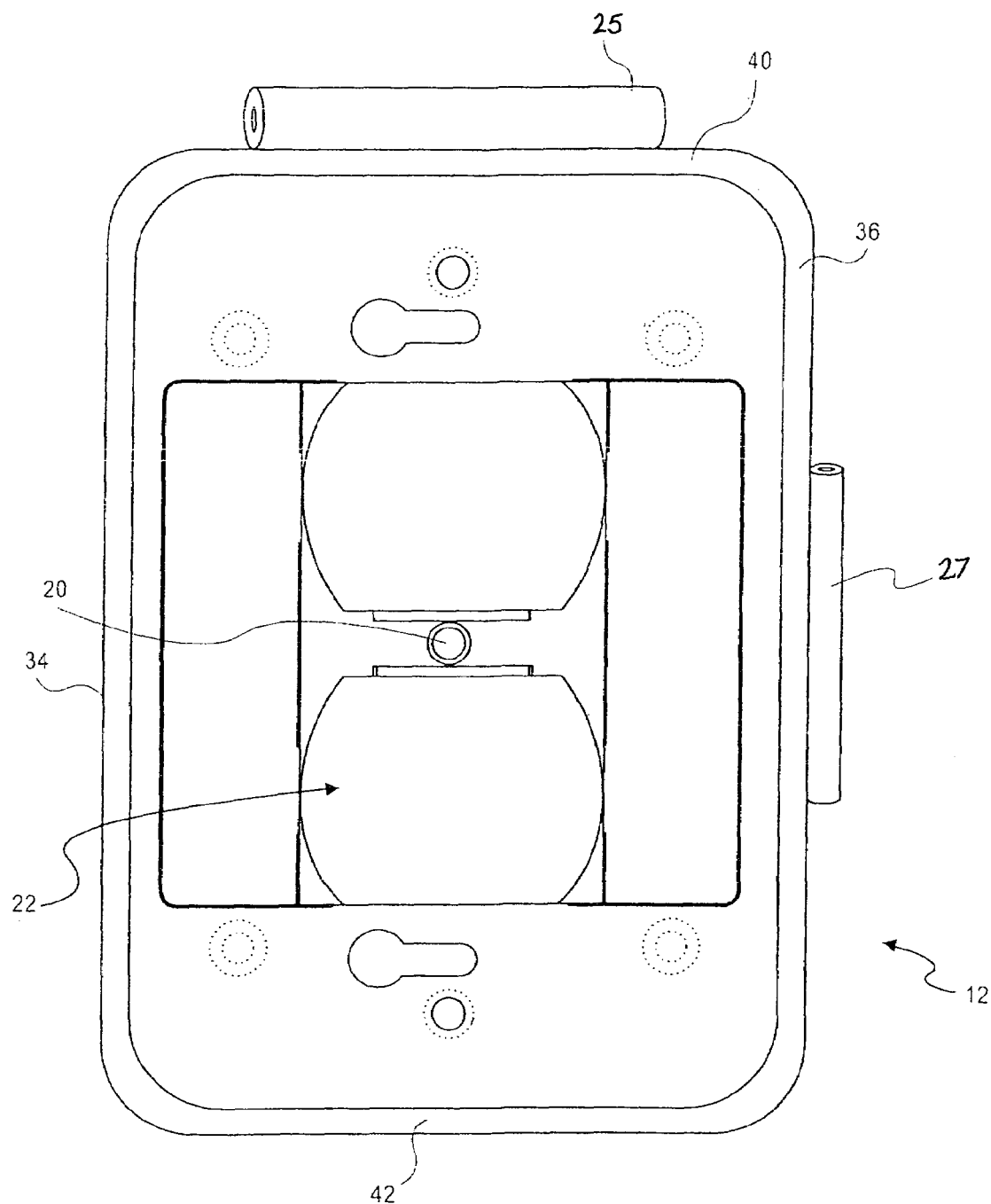
FIG. 13 is a front view of a base of an electrical outlet cover assembly configured according to an embodiment of the second approach.

As illustrated in FIGS. 9–11, particular embodiments of the present invention relate to an electrical outlet cover assembly 2 comprising a lid 4, a base 12, hinge members 21, 23, 25 and 27, and a hinge pin member 50. FIGS. 11 and 13 show examples of a base 12 configured according to this second approach.

In addition to the components of the general base described with reference to the first approach (i.e. weather-resistant elements, designed to provide structure for lid to attach, etc.), the base 12 of this second approach also includes base hinge member 25 and 27. These base hinge members 25 and 27 are aligned on adjacent sides 34 and 36 of the base. These base hinge members 25 and 27 allow the lid 4 to attach to either of edges 34 and 36 and therefore, the lid 4 may open in either of two different directions depending upon which axis the hinge pin member 50 is aligned with.

The base 12 and base hinge members 25 and 27 may be formed from any process or material that will provide the strength and durability required for the present invention. The base 12 and base hinge members 25 and 27 should be rugged, water resistant and corrosion resistant and, is generally formed of a material similar to the lid 4. The base 12 and base hinge members 25 and 27 may be formed in one piece, such as if the part is molded as a single part, or in multiple pieces and then assembled.

Figure 12:
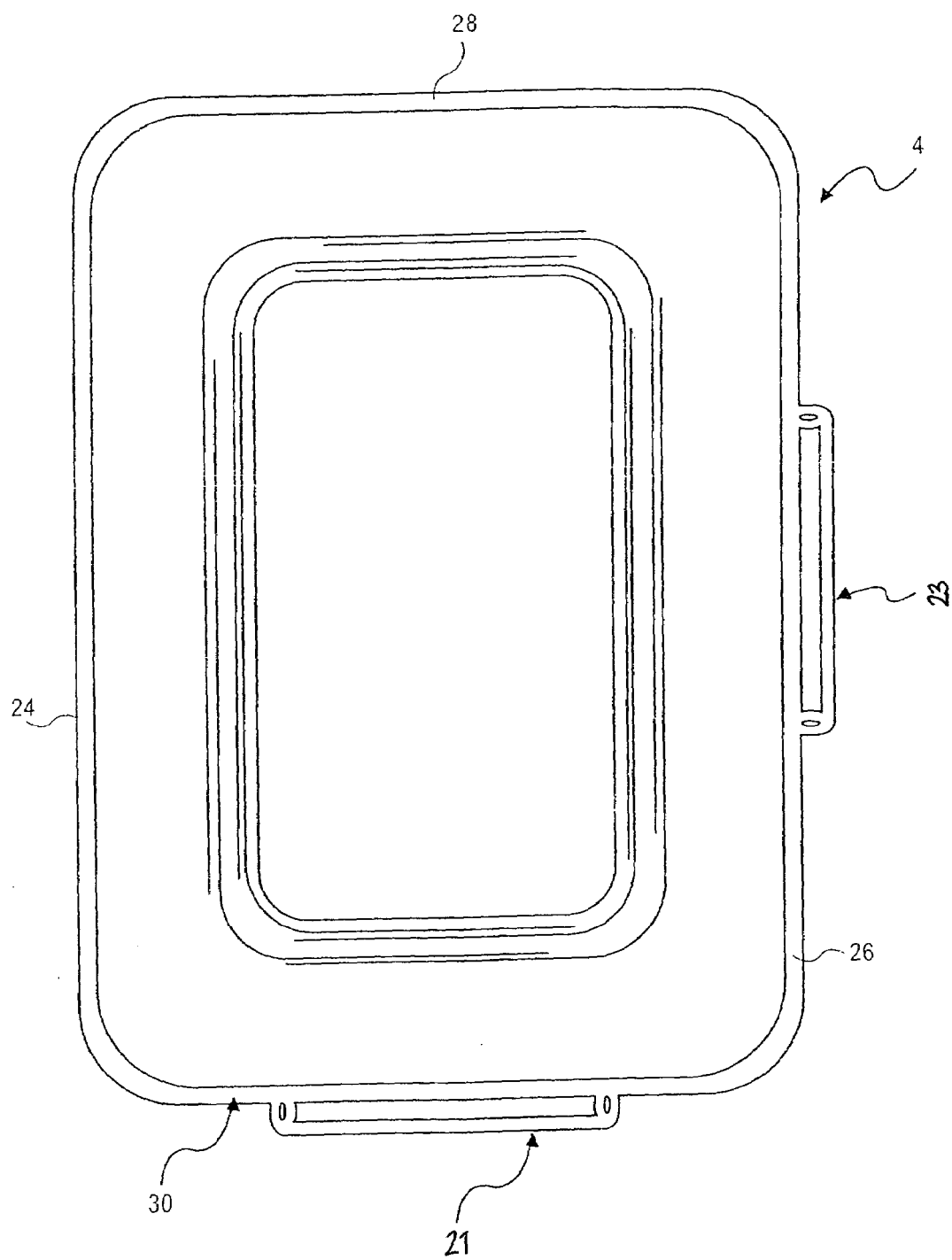
FIG. 12 is a front view of a lid of an electrical outlet cover assembly configured according to an embodiment of the second approach.

With reference to FIGS. 12 and 13, the lid hinge members 21 and 23 may be arranged as follows in an embodiment of the present invention. Lid hinge member 21 or 23 may be aligned along one side of the lid 4. The lid hinge member 21 or 23 is placed so that it will mate with a respective base hinge member 25 or 27 on a side of the base 4 and form hinges when the hinge pin member 50 is added. Lid hinge member 21 or 23 mates with a respective base housing hinge member 25 or 27, and the pin 50 is inserted into the recess created by the mated hinge members 21 or 23 and 25 or 27, forming a hinge that allows the lid 4 to pivot open and closed over the base 12 by pivoting about an axis substantially parallel to a side 36 or 40 of the base 12.

The lid 4 and lid hinge members 21 and 23 may be formed from any material with the strength and durability to protect the electrical outlet and plugs from weather and some level of mechanical shock. The lid 4 and hinge members 21 and 23 should be formed of a rugged, waterproof, corrosion resistant and electrically nonconductive material. Some form of plastic is the most common material used for while-in-use covers. The lid 4 and lid hinge members 21 and 23 may be formed in one piece. For instance they may be molded as a single unit. The lid 4 and lid hinge members 21 and 23 may also be formed in multiple pieces and assembled.

FIG. 13 is an example of a base 12 designed to include base hinge members 25 and 27 that are arranged to mate with the lid hinge members 21 and 23. The base 12 and base hinge members 25 and 27 may be formed from any process or material that will provide the strength and durability required for the present invention. The base 12 and base hinge members 25 and 27 should be rugged, waterproof, corrosion resistant and electrically nonconductive and is generally formed of a material similar to the lid 4. The base 12 and base hinge members 25 and 27 may be formed in one piece, such as if the part is molded as a single part, or in multiple pieces and then assembled.

Figure 14B:
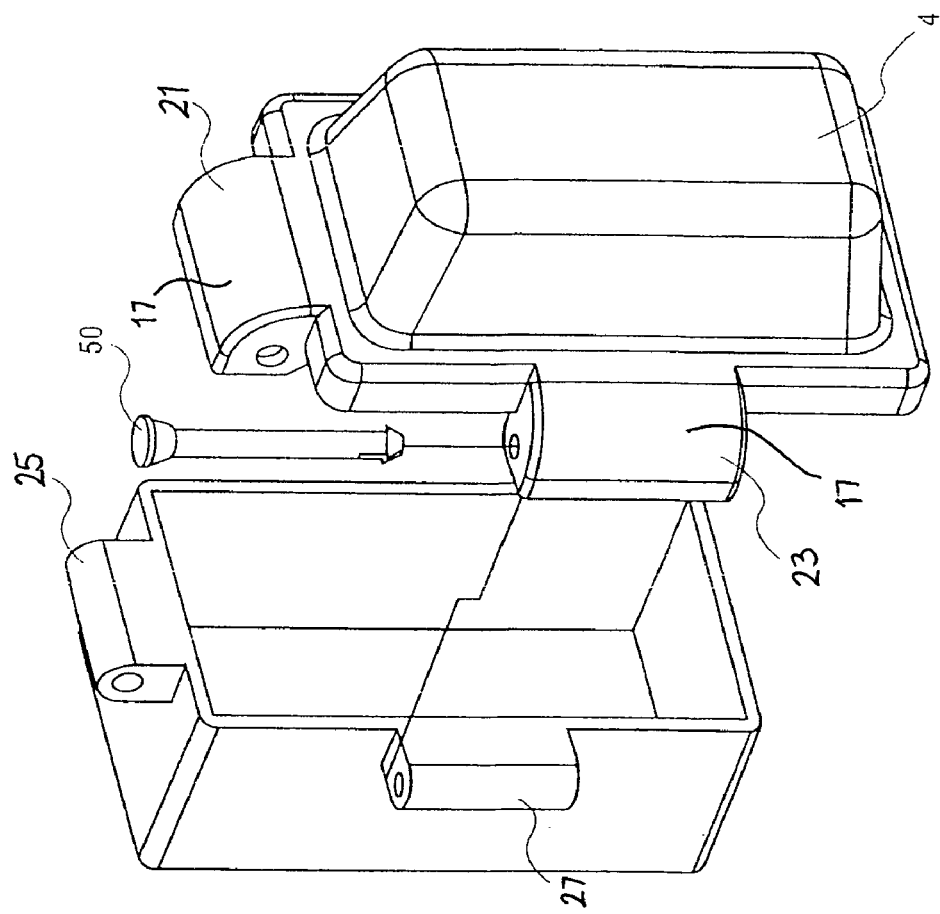
FIG. 14B is a perspective view of a lid and a base of the electrical outlet cover assembly of FIG. 14A.
Figure 14A:
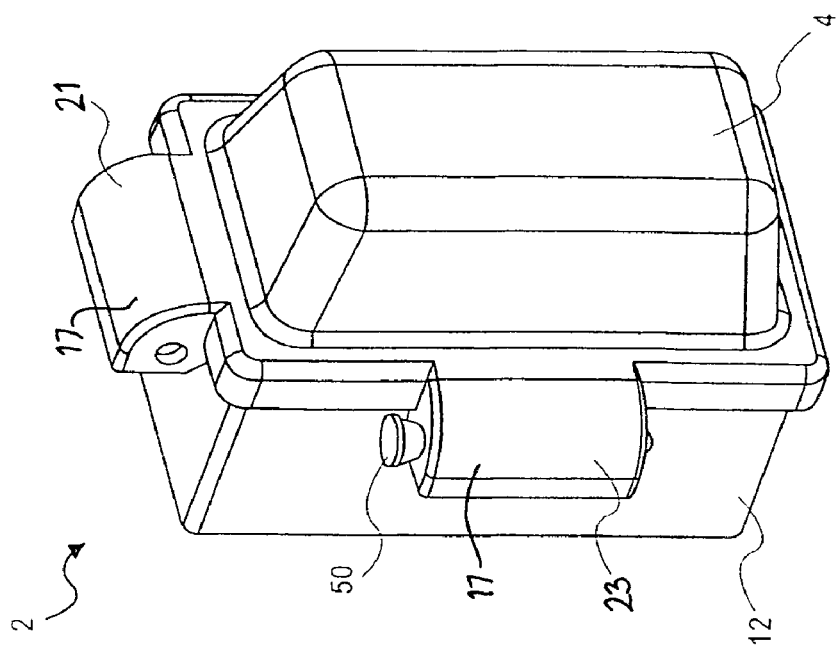
FIG. 14A is a perspective view of an electrical outlet cover unit assembly configured according to an alternate embodiment of the second approach.

The hinge pin 50 is designed to be selectively removed and inserted into the apertures created by the hinge members (21 or 23 and 25 or 27) on either side of the electrical outlet cover assembly 2. The pin 50 is inserted into the hinge members (21 or 23 and 25 or 27) to hingedly attach the lid 4 to the base 12, allowing the lid 4 to pivot open and closed. The pin 50 may be formed from any process or material that will provide the strength and durability required for the present invention. The pin 50 should be rugged, waterproof and corrosion resistant. Metal, plastic and any other material conventionally used to make pins are contemplated. Additionally, the pin 50 may have some characteristic allowing it to remain in place while hingedly attaching the lid 4 to the base 12, like some type of notch, score lines, or grooves, or other attachment to cause it to remain within the lid and base hinge members. The pin 50 may be either singular, where all hinge members 21, 23, 25 and 27 are the same size and the pin 50 may be alternated between them, or there may be multiple pins 50 where at least one pin 50 is sized to fit in each hinge pair 21 and 25, and 23 and 27. FIGS. 14A and 14B show another specific embodiment of the second approach using a pin 50, but having shield 17 on the lid hinge member 21 and 23 that covers the base hinge member 25 and 27 when installed and also provides a stop against the base 12 when the lid 4 is opened through interference of the lid hinge member 21 or 23 with the side of the base 12.

As with particular embodiments of the other approaches, a problem that may occur in a situation where there are two hinge members per lid or base (21 and 23, and 25 and 27 for instance), but only one hinge member is used at a time, is that the unused hinge members may interfere with the function of the electrical outlet cover assembly 2. This may occur if one or more unused lid hinge member bumps, catches or otherwise interferes with the corresponding unused base hinge member. This may be avoided by providing that when one hinge member 21 or 23 of the lid 4 is attached to the mating hinge members 25 or 27 on the base 4, the unused mating pair of hinge members are on opposite sides of the electrical outlet cover assembly 2. In this way, the unused hinge members will not interfere with each other. Slight modifications to the lid or hinge members may be necessary in certain designs to ensure the unused hinge members do not interfere with the operation of the electrical outlet cover assembly 2. Those of ordinary skill in the art will understand those changes needed for a particular design from the disclosure provided herein.

Many other arrangements may be possible that would prevent the unused sets of hinge members from interfering with the operation of the electrical outlet cover assembly 2. For instance, openings or recesses may be created in the lid 4 or base 12 in order to receive the unused sets of hinge members, without the assemblies interfering with operation of the invention.

The Third Approach: Pivoting Hinge Arm

Figure 15:
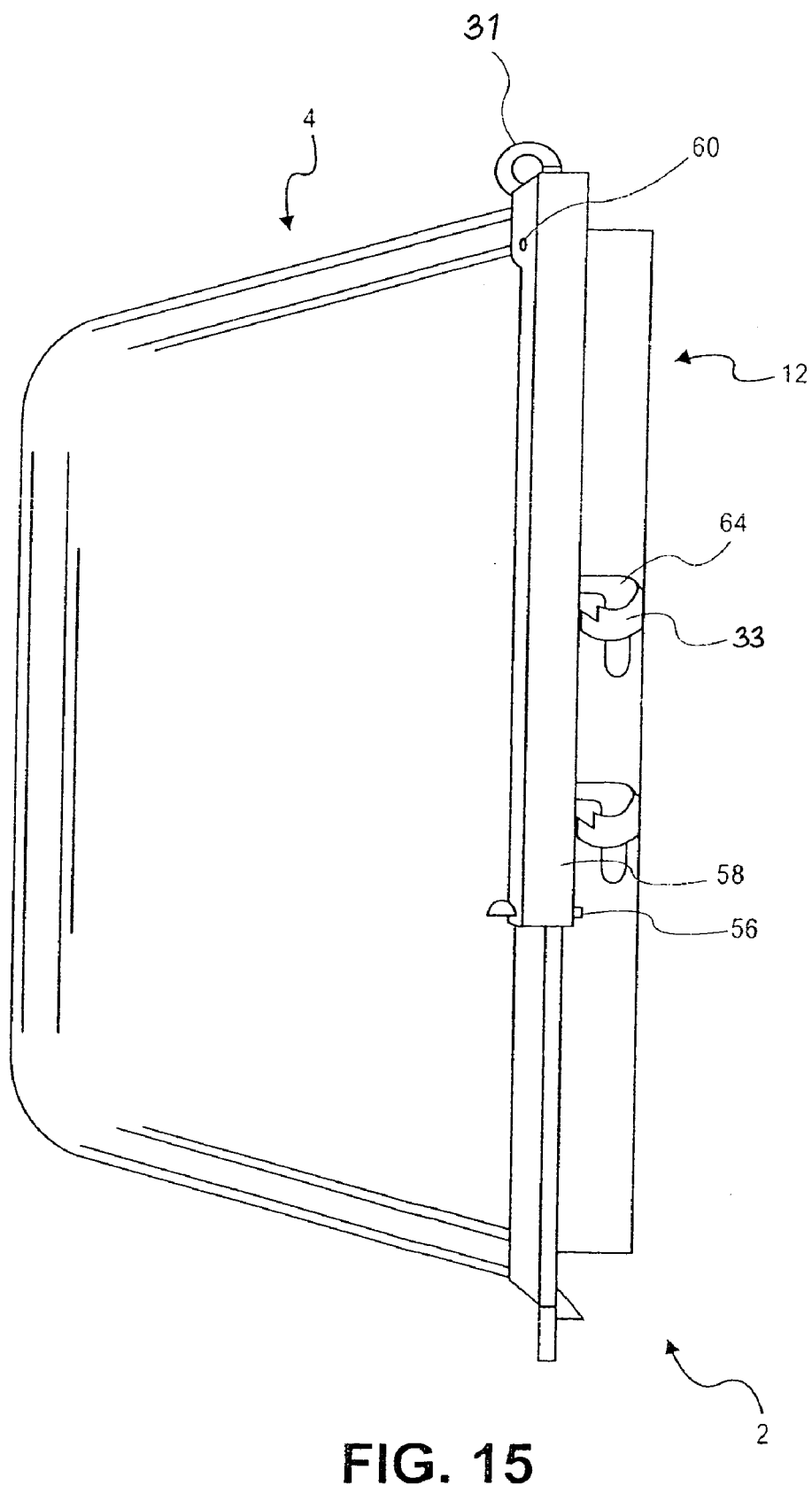
FIG. 15 is a side view of an assembled electrical outlet cover assembly configured according to an embodiment of a third approach.
Figure 16:
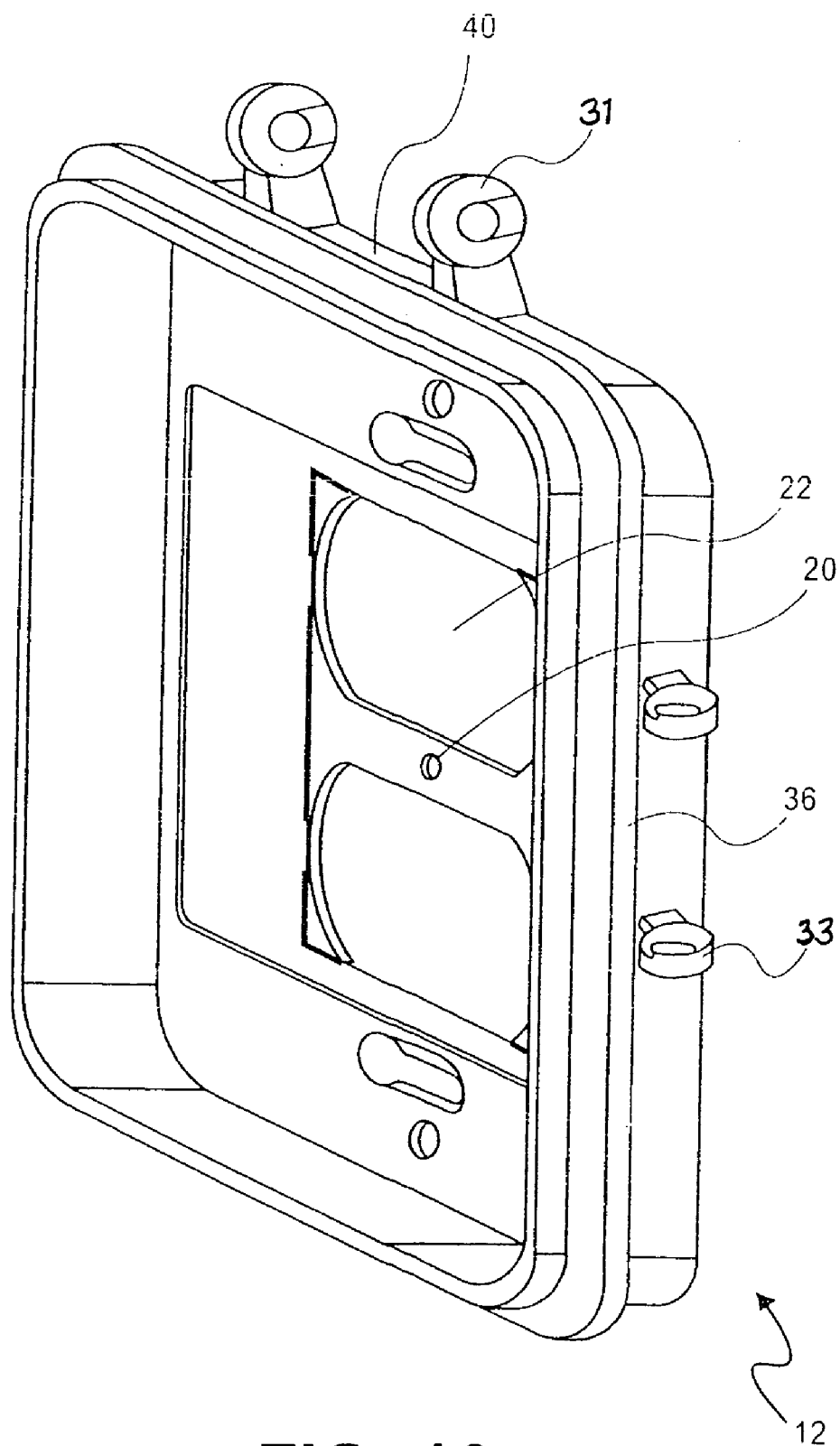
FIG. 16 is a perspective view of a base of an electrical outlet cover assembly configured according to an embodiment of the third approach.

As illustrated in FIG. 15, particular embodiments of the third approach relate to an electrical outlet cover assembly 2 consisting of a lid 4, a base 12, hinge members 31, 33 and 64, and a pivoting hinge member arm 58. FIG. 16 shows a base 12 configured according to an embodiment of this third approach. The purpose of the base 12 is to provide a structure to which the lid 4 may be pivotally mounted. The base 12 is generally planar. The base 12 generally includes openings 22 that allow access to the electrical outlet and openings 20 that allow attachment of the base 12 to an electrical outlet and mounting box. Like the bases of the other approaches, the base 12 has a lip designed to mate with a lip on the lid 4. The lip on the base 12 may be a slightly protruding edge designed to be received by a channel on the lid 4, or it may be any other design that provides a fluid deterrent between the lid 4 and the base 12 when the lid 4 of the electrical outlet cover assembly 2 is closed.

The base 12 also contains base hinge members 16. These base hinge members 31 and 33 are aligned on adjacent edges 36 and 40 and allow the lid 4 to attach to either of edges 36 and 40 so that it can pivot in either two different directions.

The base 12 and base hinge members 31 and 33 may be formed from any process or material that will provide the strength and durability required for the present invention. The base 12 and first hinge members 31 and 33 should be rugged, water resistant and corrosion resistant and is generally formed of a material similar to the lid 4. The base 12 and first hinge members 31 and 33 may be formed in one piece, such as if the part is molded as a single part, or in multiple pieces and then assembled.

Figure 17:
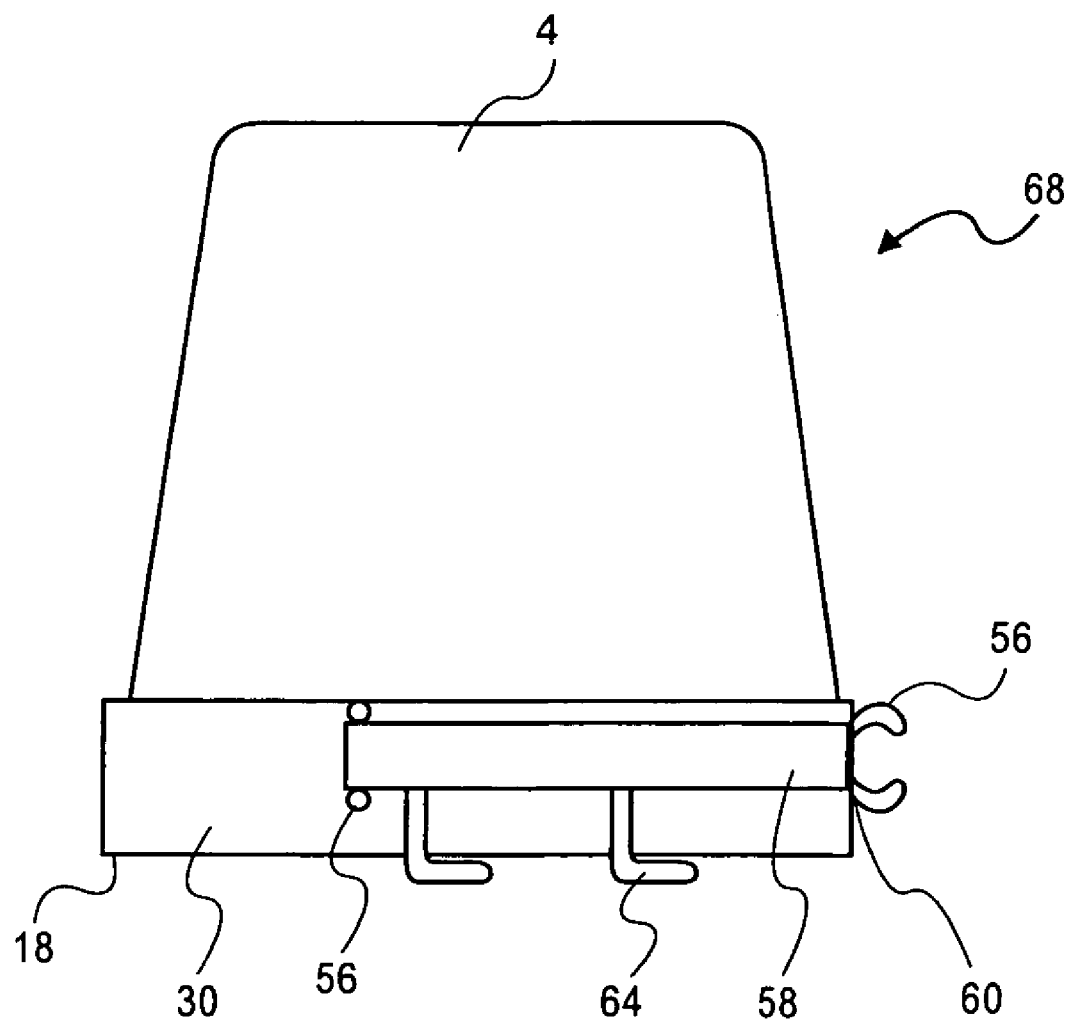
FIG. 17 is an end view of a lid of an electrical outlet cover assembly configured according to an embodiment of the third approach.

FIG. 17 illustrates a lid configured according to a particular embodiment of the third approach. The lid 4 may be a box-like structure with an open back side 18. The lid 4 includes arm hinge members 64, which are attached to a pivoting hinge member arm 58. The pivoting hinge member arm 58 is attached to the lid 4 through a pivot hinge 60. This pivot hinge 60 allows the pivoting hinge member arm 58 and the arm hinge members 64 to pivot between two adjacent sides of the lid 4. When the pivoting hinge member arm 58 is in place against the desired side of the lid 4, the pivoting hinge member arm 58 may be locked into place using a locking device 56. The pivoting hinge member arm 58, pivot hinge 60 and locking devices 56 allow the arm hinge members 64 to be locked into place in a desired position in order to mate with the base hinge members 31 or 33 on the base 12 as shown in FIG. 15.

Referring back to FIG. 17, if it is desired that the lid 4 open about an axis substantially parallel to the short edge 30, then the pivoting hinge member arm 58 is pivoted about the pivot hinge 60 until the pivoting hinge member arm 58 is up against the short edge 30 of the lid 4. The pivoting hinge member arm 58 is then locked into place by locking device 56. This places the arm hinge members 64 in position to mate with the base hinge members 16 that are on the short edge 40 of the base 12. Once connected, the lid 4 will open about an axis substantially parallel to the short edge 40.

If, however, it is desired to have the lid 4 open about the long side 36 of the base 12 (FIG. 16), then the pivoting hinge member arm 58 that is pivotally hinged to the lid 4 should be pivoted until it is firmly against the long side 26 of the lid 4. The pivoting hinge member arm 58 is then locked into place with locking device 56. The arm hinge members 64 are now in position to mate with the base hinge members 16 on the base 12 as shown in FIG. 15.

Referring to FIG. 17, the lid 4 and arm hinge members 64 may be formed from any material with the strength and durability to protect the electrical outlet and plugs from weather and some level of mechanical shock. The lid 4 and arm hinge members 64 should be formed of a rugged, water resistant and corrosion resistant material. Some form of plastic is the most common material used for while-in-use covers, though metal covers are also used. The pivoting hinge member arm 58 and arm hinge members 64 may be formed in one piece or formed separately and assembled. The lid 4 and locking devices 56 may also be formed as a single piece or as separate pieces and then be attached together.

Figure 18:
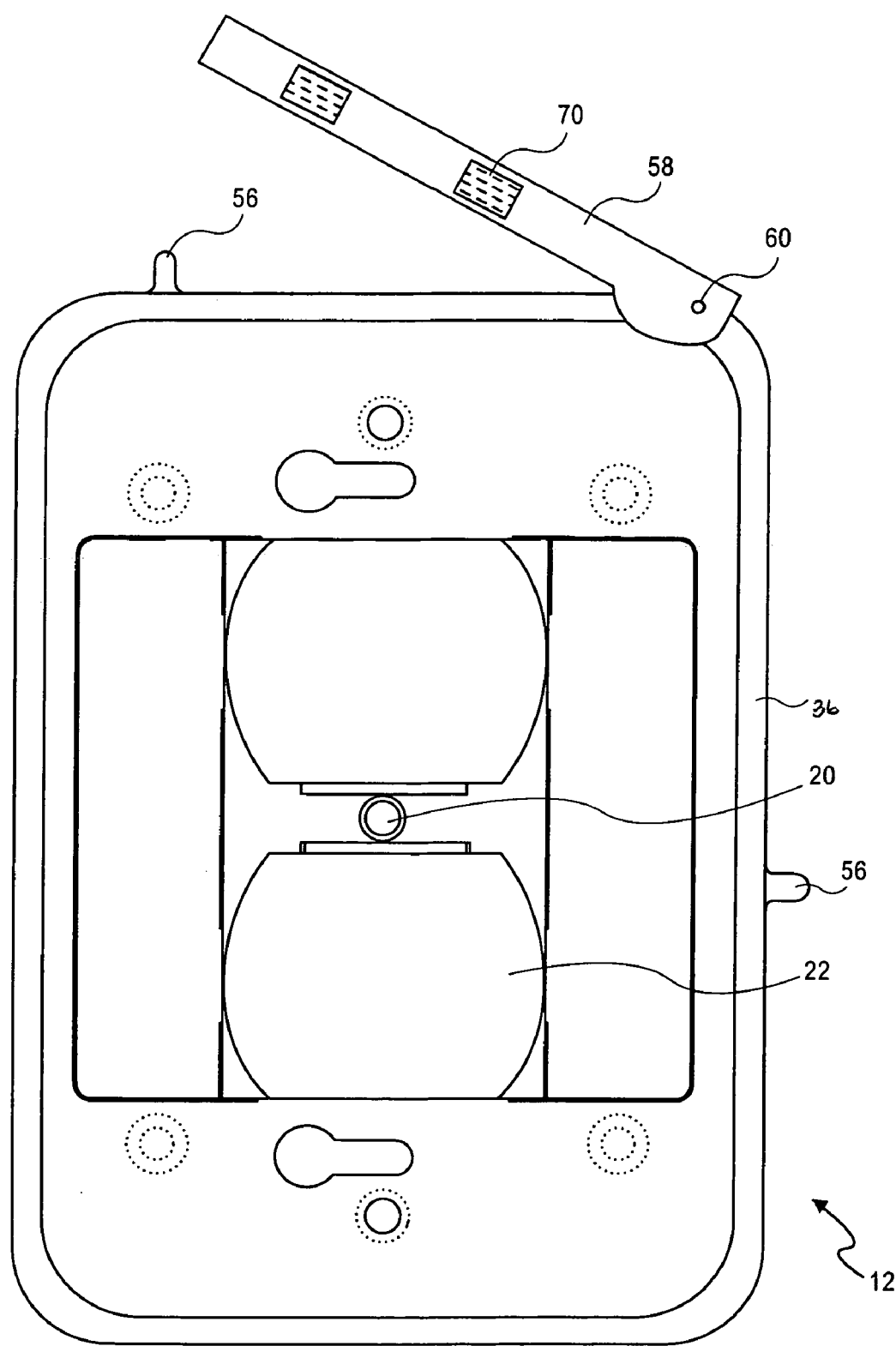
FIG. 18 is a front view of a base of an electrical outlet cover assembly configured according to an alternate embodiment of the third approach.

FIG. 18 illustrates the fact that the pivoting hinge member arm 58, and pivoting hinge 60 may be attached to the lid 4 or the base 12. If the pivoting hinge member arm 58 and the pivoting hinge 60 are attached to the base 12, then two sets of hinge members should then be attached to the lid 4. Those of ordinary skill in the art will readily understand how this may be accomplished from the disclosure provided herein. It may also be possible to have a pivoting hinge member arm 58 and a pivoting hinge 60 attached to both the base 12 and the lid 4. There would therefore, be no extra hinges that could interfere with the operation of the electrical outlet cover assembly 2.

Figure 19:
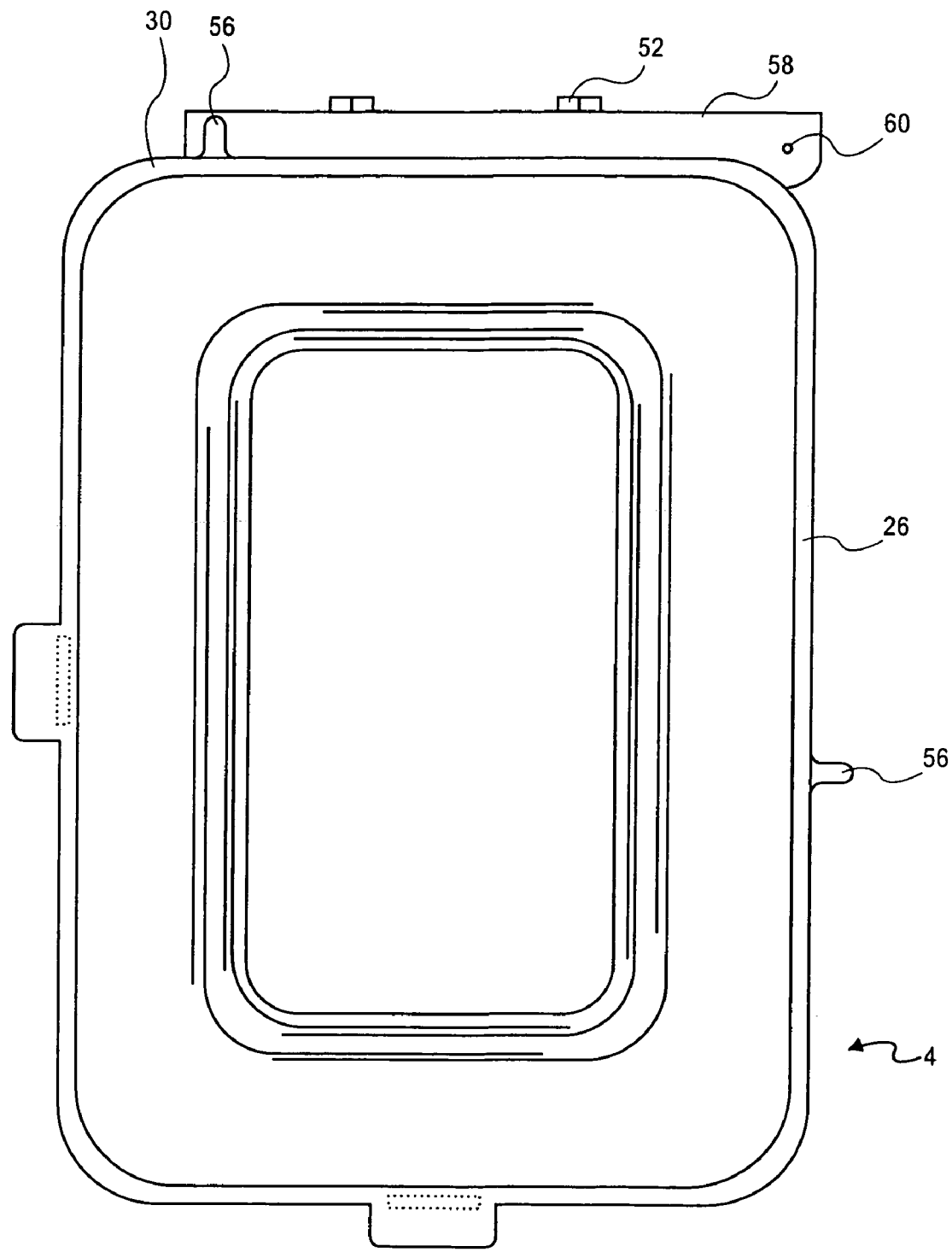
FIG. 19 is a front view of a lid of an electrical outlet cover assembly configured according to an alternate embodiment of the third approach.

Also, any type of hinge member may be attached to the pivoting hinge member arm 58 as illustrated in FIGS. 18 and 19. The male or female hinge member may be attached to either the lid 4 or the base 12. The only requirement is that the hinge member on the base 12 be able to mate with the corresponding hinge member located on the lid 4.

It is also possible that the hinge members 64 and attached pivoting hinge member arm 58 would not pivot, but instead the pivoting hinge member arm 58 would lock into place on the sides of either the base 12 or lid 4. The pivoting hinge member arm 58 with the attached arm hinge members 64 would be completely detachable from the outlet cover assembly 2. The pivoting hinge member arm 58 could then be locked into the desired position on the outlet cover assembly 2, by simply pushing the pivoting hinge member arm 58 into place.

Fourth Approach: Attachable Hinge Members

Figure 20:
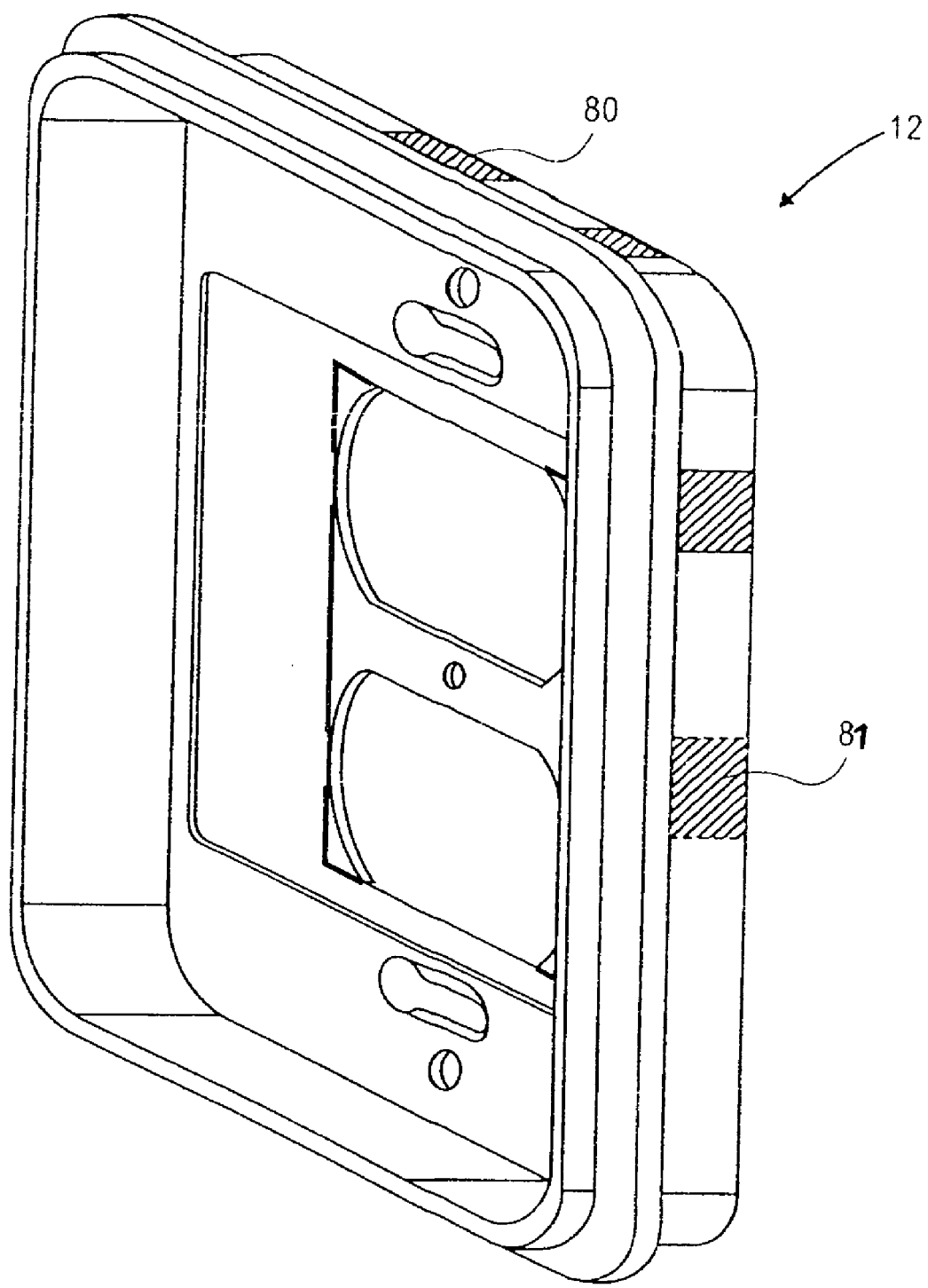
FIG. 20 is a perspective view of the electrical outlet assembly base with possible preset installation locations shown with grid marks configured according to an embodiment of a fourth approach.
Figure 21:
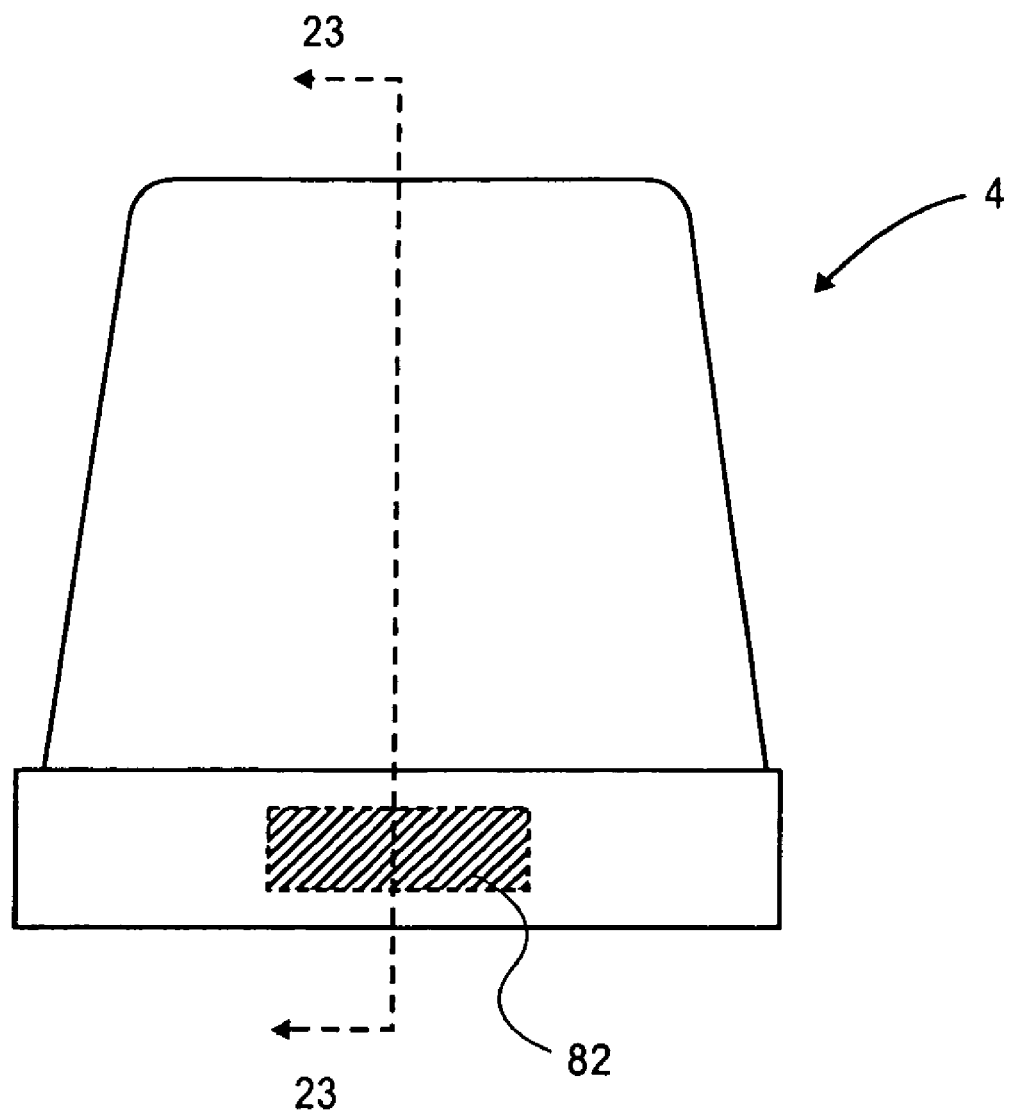
FIG. 21 is an end view of the electrical outlet assembly cover for use with the base of FIG. 20.
Figure 22:
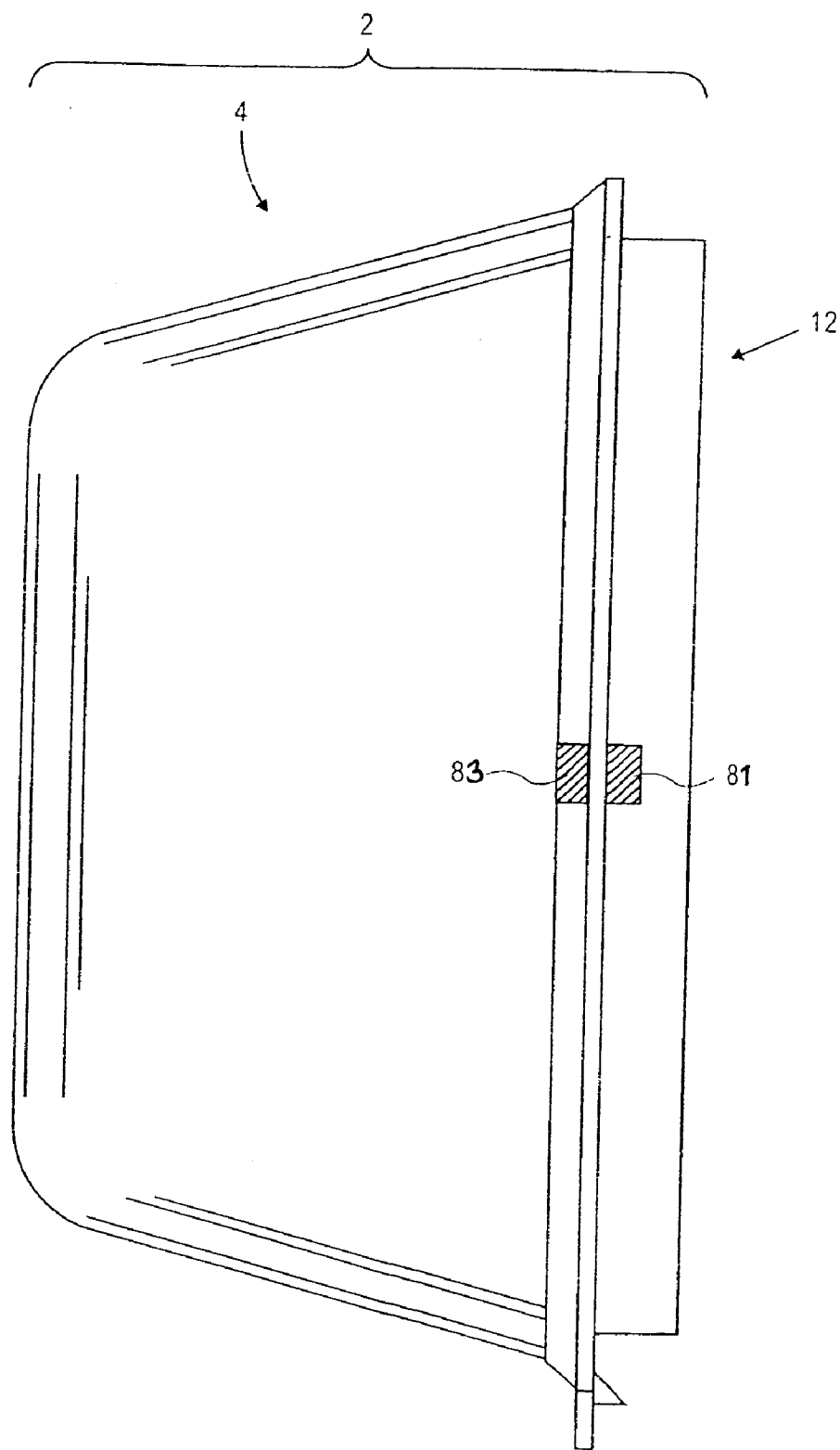
FIG. 22 is a right side view of the electrical outlet assembly cover and base of FIGS. 20 and 21.

Referring to FIGS. 20–22, a customizable electrical outlet cover assembly 2 consists of a base 12 and a lid 4 that has preset locations for the placement of at least one attachable hinge element as indicated by grid marks 80 and 82. The particular locations for the placements in these figures are only intended to be representative that there can be preset locations. In practice, the precise placement of the locations 80 and 82 will depend upon the needs of an installer and a particular type of outlet box assembly unit. As explained with respect to other figures below, knock-outs or apertures may be included at various locations on the lids and/or bases to correspond to locations for attachable hinge elements.

Figure 23:
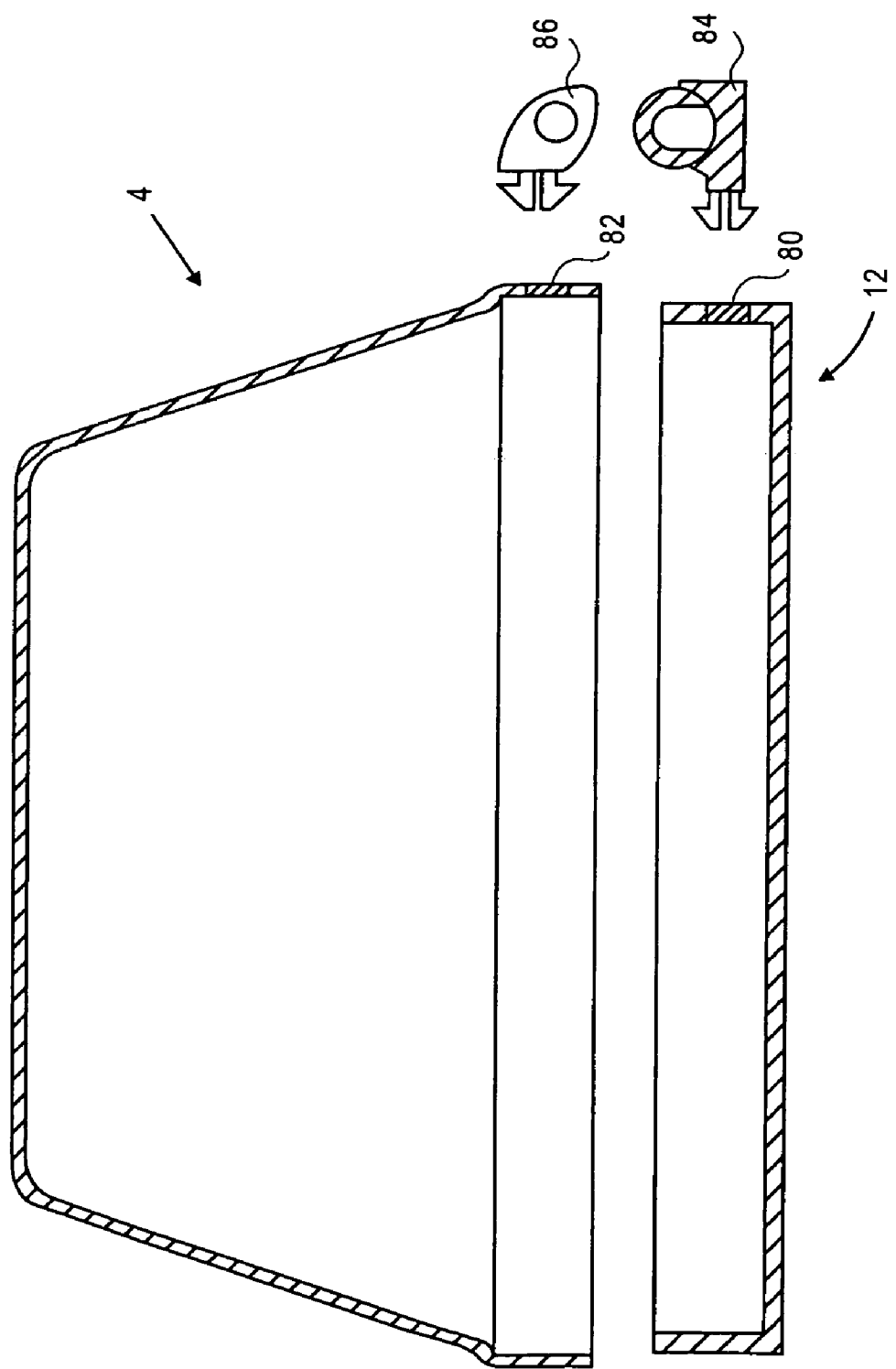
FIG. 23 is a cross sectional right side view of an electrical outlet assembly base and cover with un-installed attachable hinge elements oriented for installation at the top side of the assembly configured according to an embodiment of the fourth approach.
Figure 24:
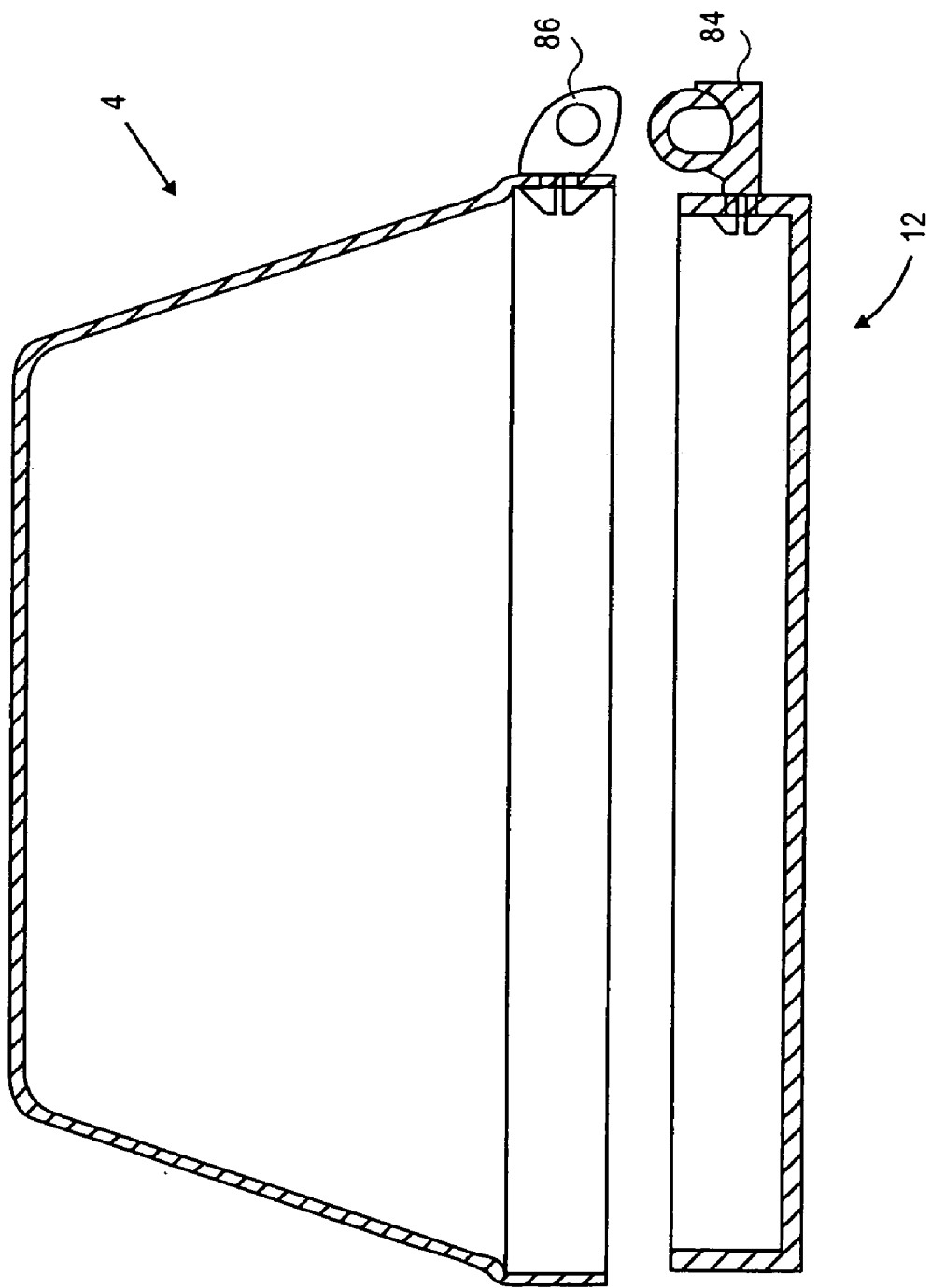
FIG. 24 is a cross sectional right side view of an electrical outlet assembly base and cover of FIG. 23.

Referring to FIGS. 23 and 24, the electrical outlet assembly may include a base 12 and a lid 4 each with preset knock-outs 80–83 or holes for attachable hinge members 84 and 86. The attachable hinges can be installed into any preset location where a knock-out or hole 80–83 exists. Therefore, the hinge members 84 and 86 can be located on any side and position that best fits the installer's needs if multiple options are preconfigured into the base 12 and/or lid 4. For example, one or more attachable hinges 84 and 86 can be located on the top side of the assembly 2 to allow the lid 4 to automatically shut when installed vertically, or a left or right side of the assembly 2 to allow the lid 4 to automatically shut when installed horizontally.

Figure 25:
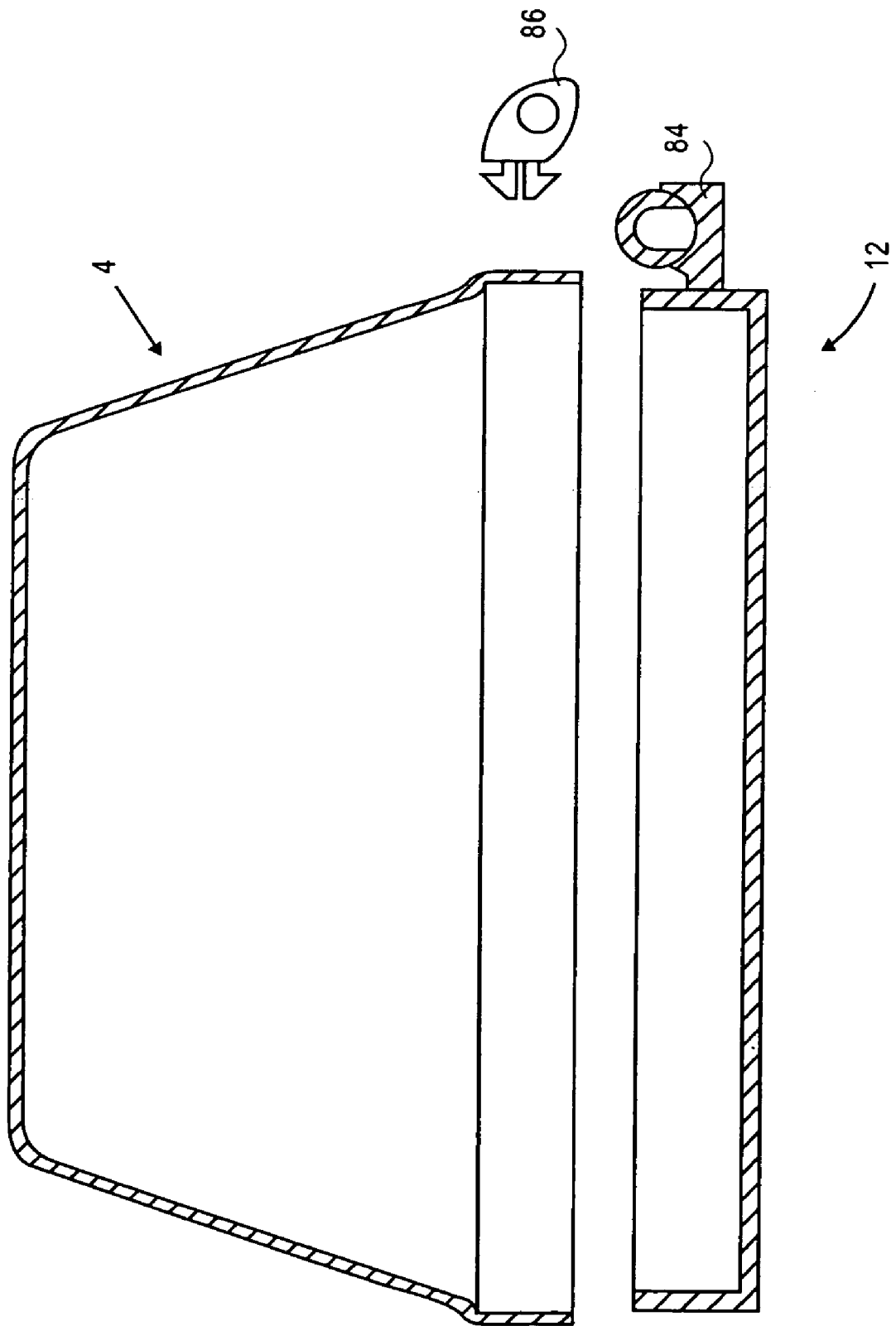
FIG. 25 is a cross sectional right side view of an electrical outlet assembly showing an un-installed attachable hinge element on the cover and a permanent hinge element for the base configured according to an embodiment of the fourth approach.
Figure 26:
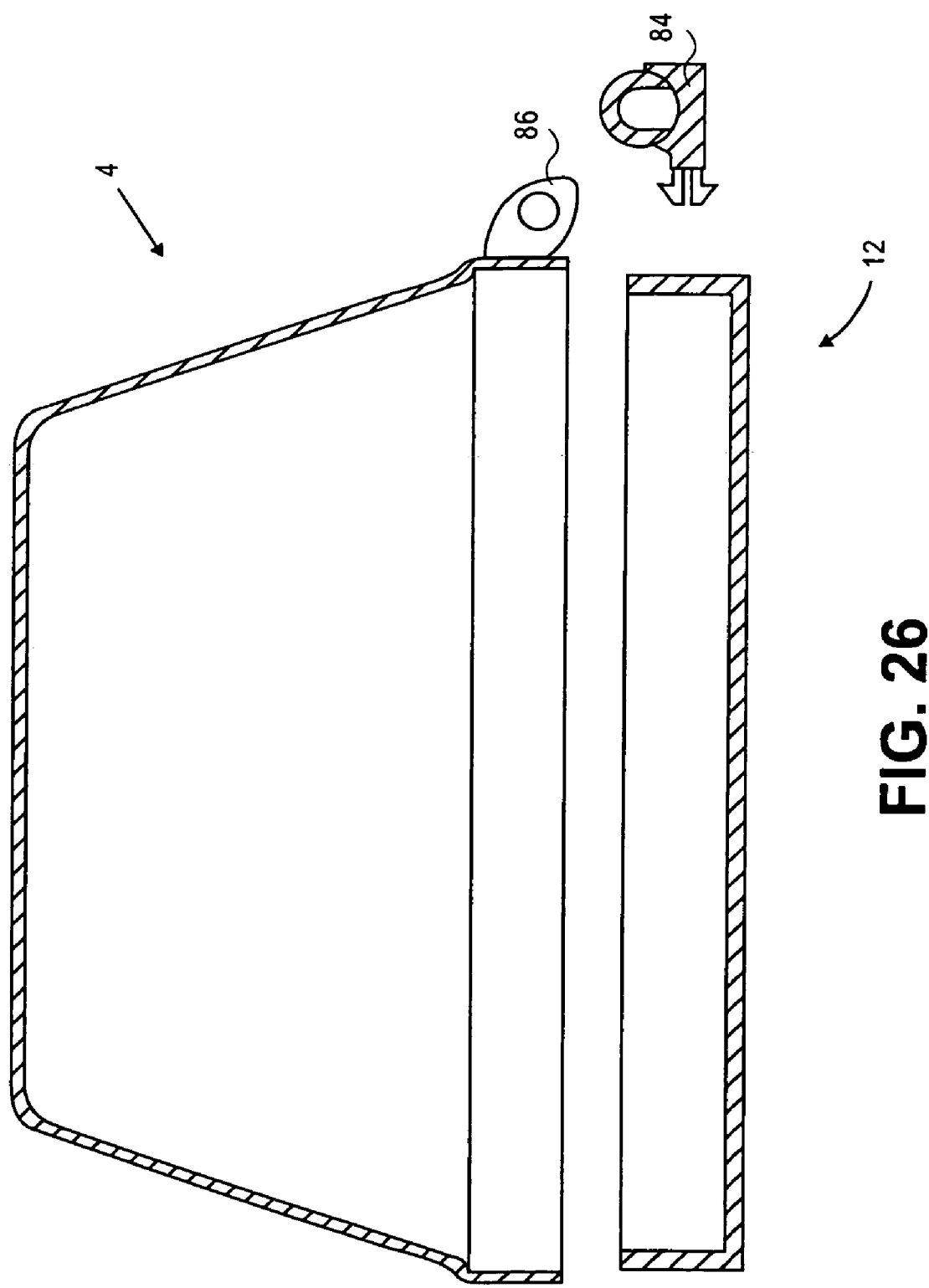
FIG. 26 is a cross sectional view of an electrical outlet assembly showing a permanent hinge element on the cover and an un-installed attachable hinge element on the base configured according to an embodiment of the fourth approach.
Figure 27:
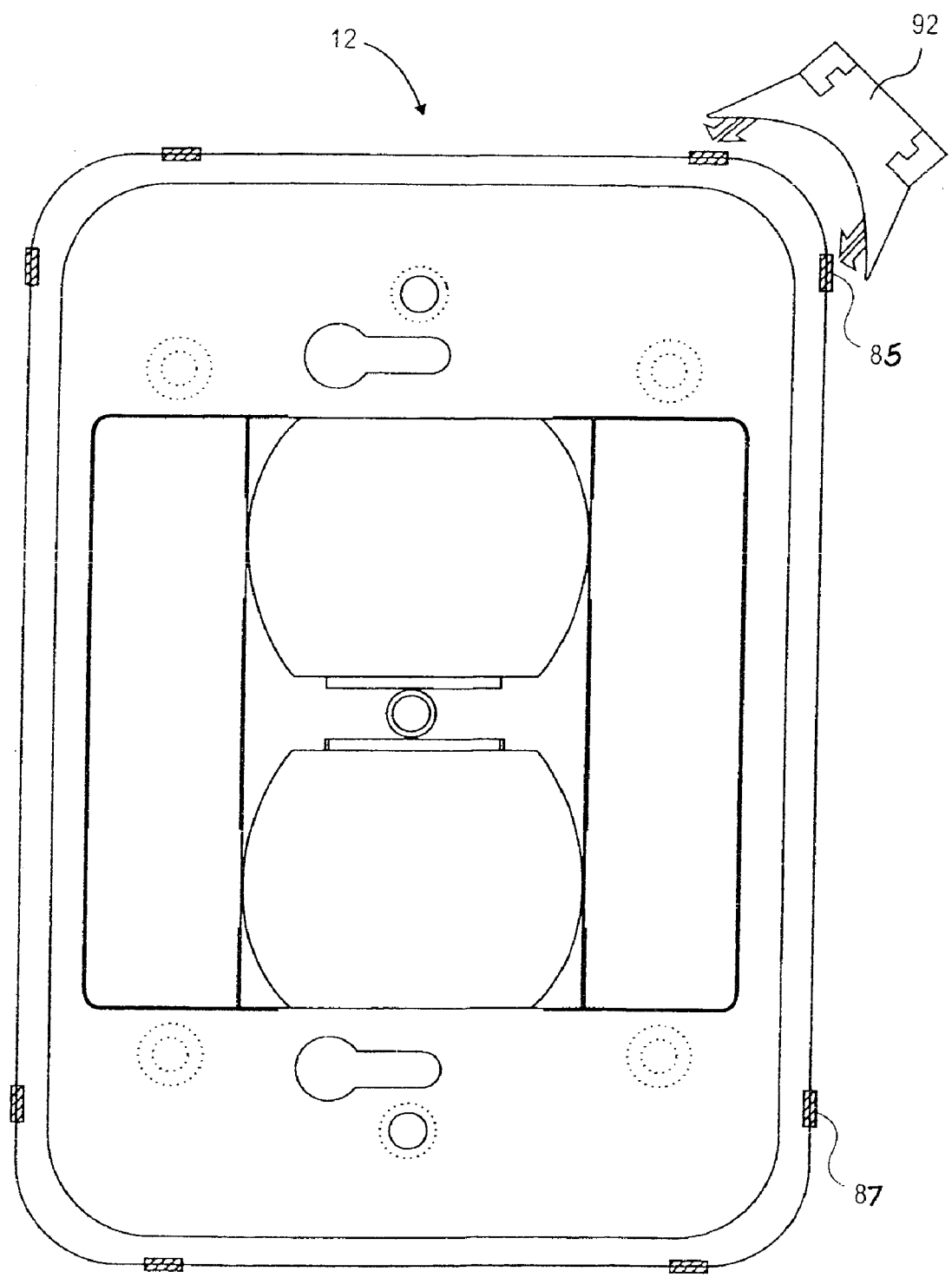
FIG. 27 is front view of an electrical outlet assembly base with a multiple, prong corner attachable hinge element configured according to an embodiment of the fourth approach.
Figure 28:
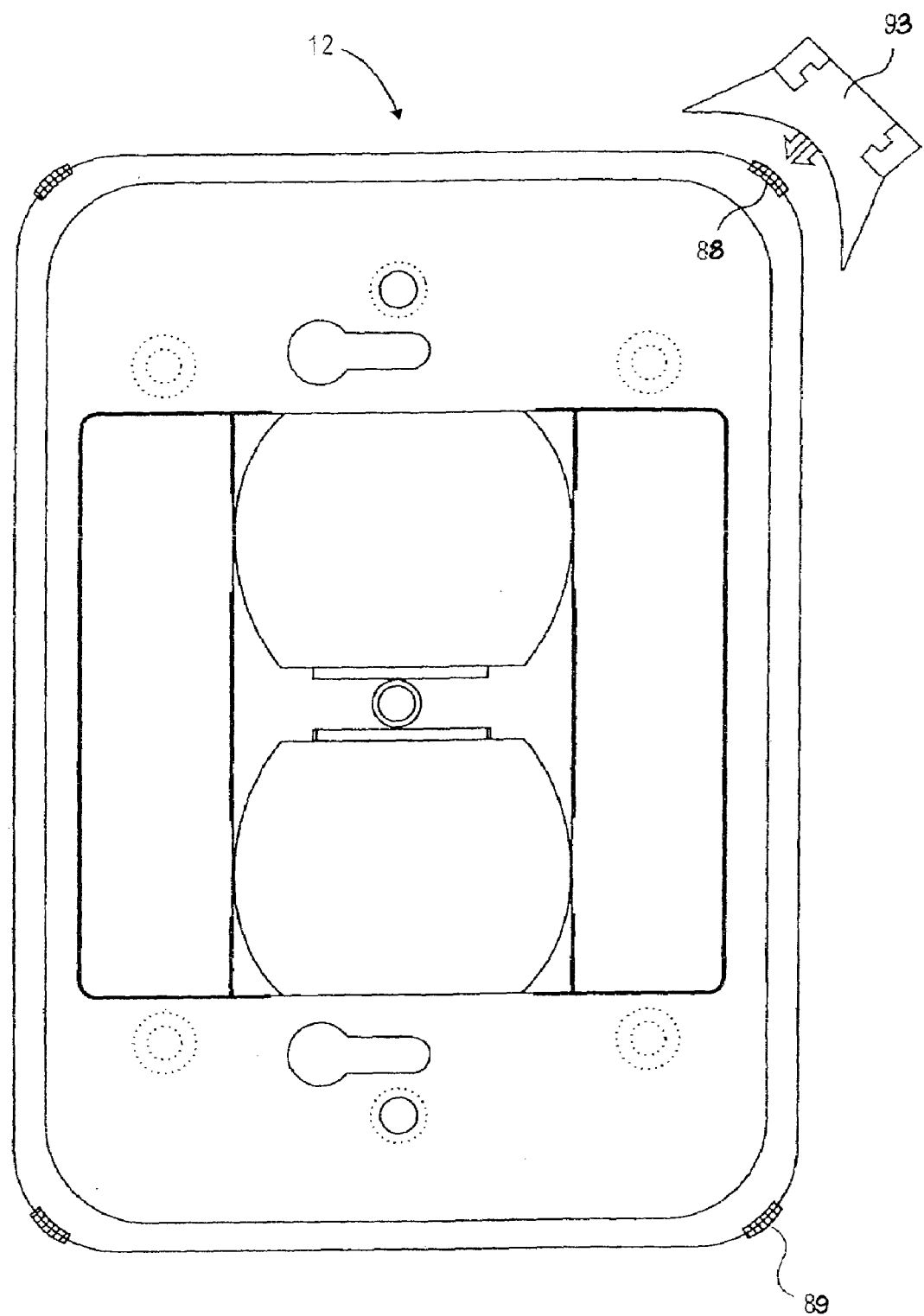
FIG. 28 is front view of an electrical outlet assembly base with a centered, pronged corner attachable hinge element configured according to an embodiment of the fourth approach.
Figure 29:
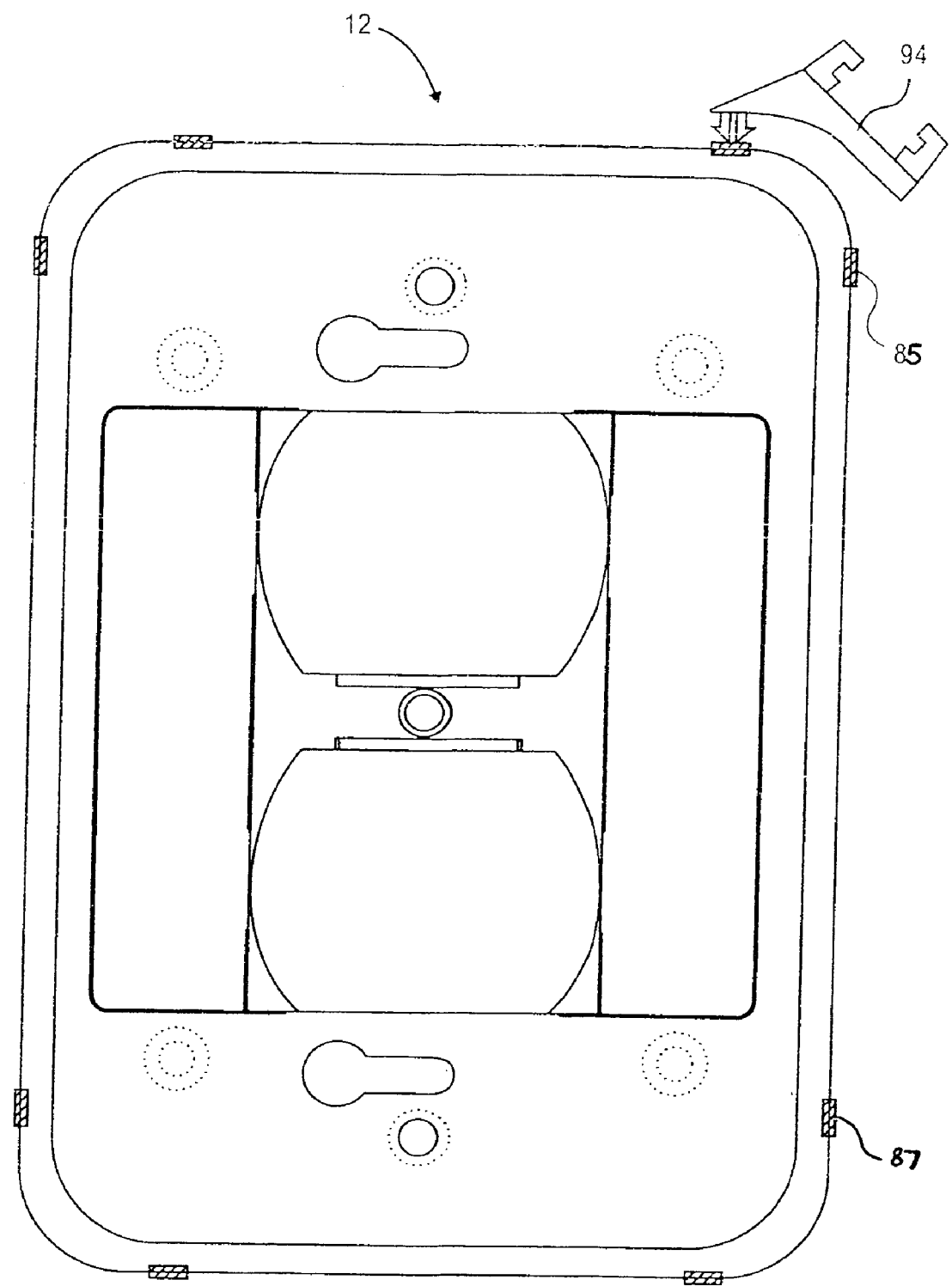
FIG. 29 is front view of an electrical outlet assembly base with a non-centered, single prong corner attachable hinge element configured according to an embodiment of the fourth approach.
Figure 30:
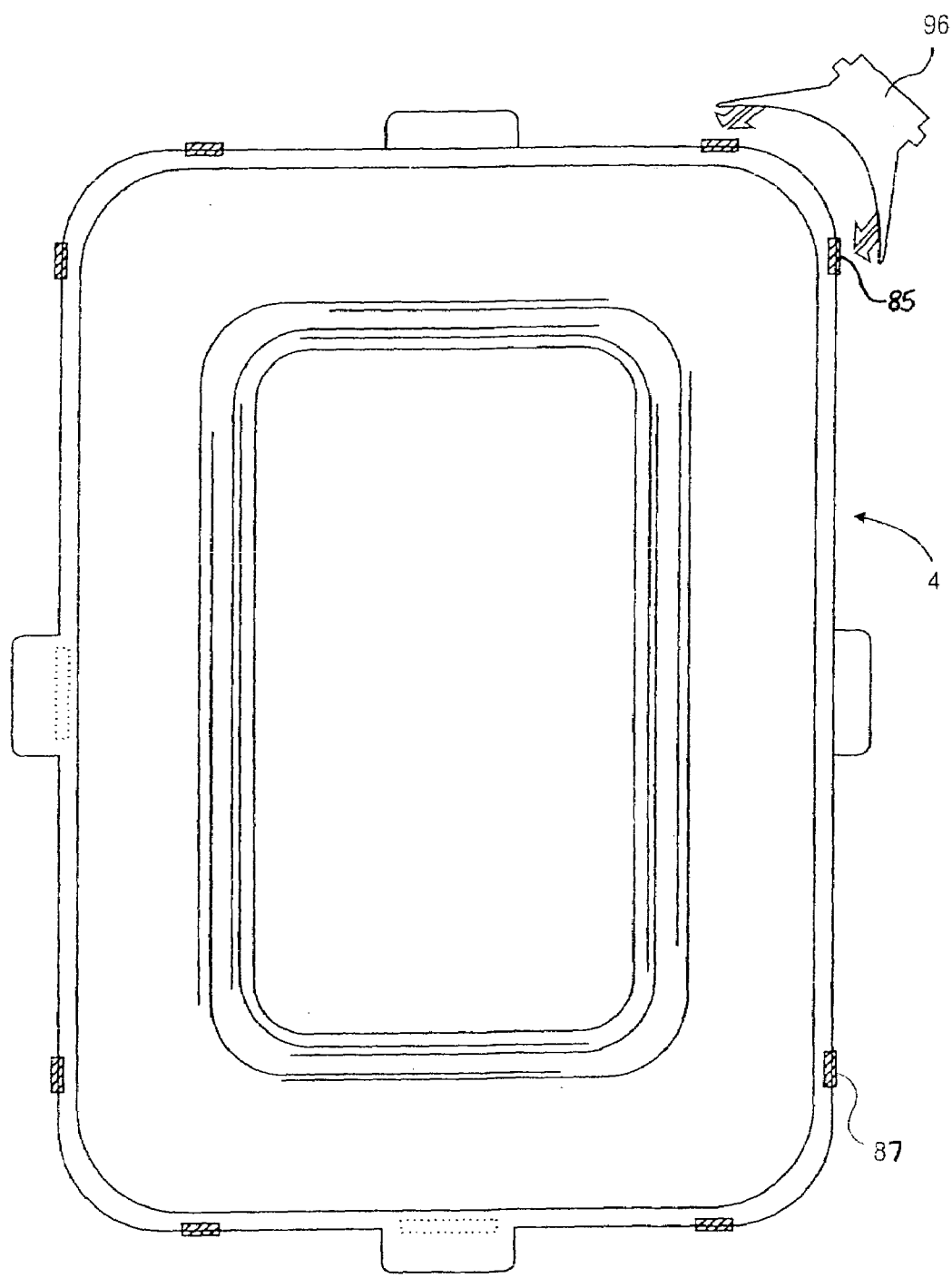
FIG. 30 is front view of an electrical outlet assembly cover with a corner attachable hinge element configured according to an embodiment of the fourth approach.

Referring to FIGS. 25 and 26, a combination of attachable and permanent hinges can be utilized that still supports customization by the installer. By including attachable hinge elements 84 or 86 on either the base 12 or the lid 4, the remaining hinge elements 88 or 90 on the base 12 or lid 4 will not interfere with each other during installation when the installer attaches hinge elements 84 or 86 on only one side or at one location for the lid 4 or base 12. This also reduces the actual material used for hinge members on the assembly 2.

Referring to FIGS. 27, 28, 29 and 30, a corner attachable hinge member 92, 93, 94 or 96 may also be configured to support installer customization. The attachable hinge member 92, 93, 94 or 96 may have at least one attachment site 85, 87, 88 or 89 on the base 12 and/or lid 4, or may have a number of attachment sites 85, 87, 88 and/or 89 for selection by an installer. As with any of the approaches to this invention, in addition to allowing the installer complete customization for a particular job, this also significantly reduces the number of SKUs a seller needs to carry because one configurable product can take the place of so many other product configurations.

It is contemplated that in particular embodiments of this fourth approach, the assemblies may be packaged with both side hinge elements 84 and 86 as well as one or more corner hinge elements 92, 93, 94 and 96 so that the installer can opt between side or corner installation. Additionally, it is contemplated that in particular embodiments of the invention, the assembly units may be packaged with different styles of hinge elements so that the installer can select the preferred hinge style for a particular application. By standardizing the connections to the lid and base, any number of different hinge styles can be provided for selection by the installer for attachment at the installation site. As illustrated by the variations between FIGS. 27, 28 and 29, the corner hinge elements 92, 93, 94 and 96 may be supported by extensions that extend through the base 12 on adjacent sides of the base 12, by one or more supports directly on the corner of the base 12, or by connections that attach only to one side of the base 12 (FIG. 29) and extend along the pivot axis.

Figure 31:
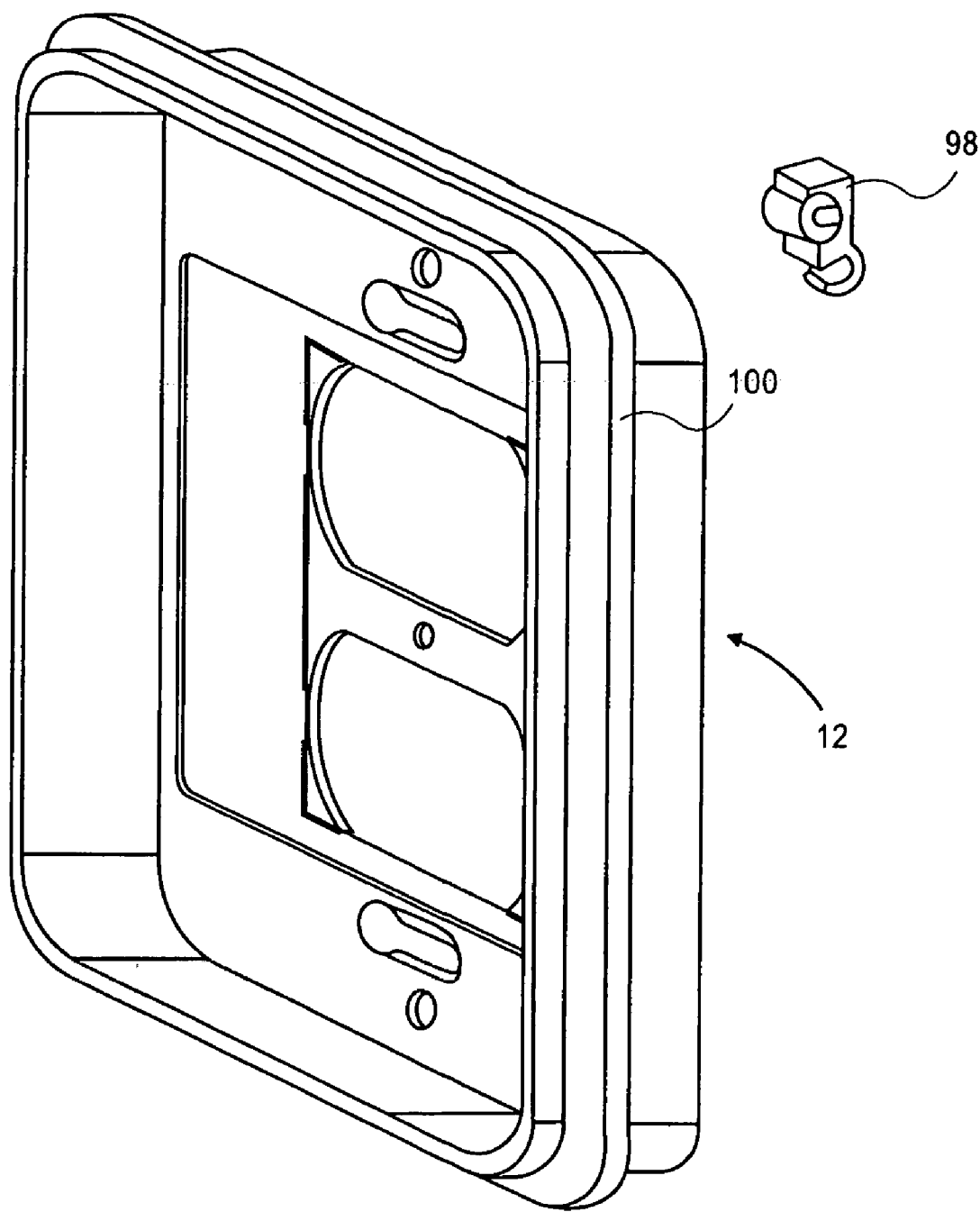
FIG. 31 is a perspective view of an electrical outlet assembly base showing a first slide-on attachable hinge element configured according to an embodiment of the fourth approach.
Figure 32:
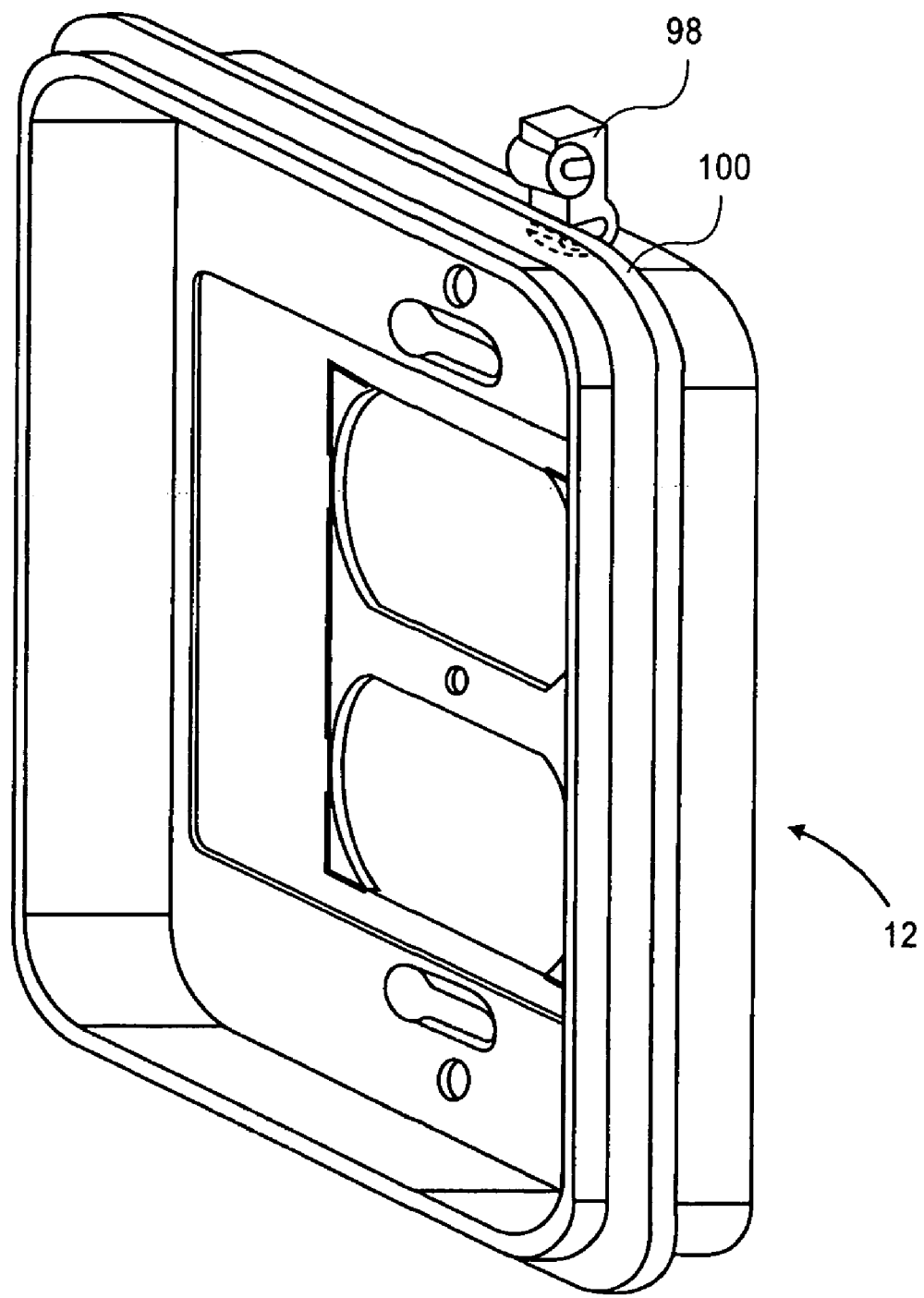
FIG. 32 is a perspective view of the electrical outlet assembly base of FIG. 31 showing the first slide-on attachable hinge element attached to the top side of the base configured according to an embodiment of the fourth approach.

Referring to FIGS. 31 and 32, one or more sliding attachable hinge elements 98 may also be used to support installer customization at the installation site. In this embodiment of attachable hinge elements, the attachable hinge elements 98 slide into a grove 100 on either side of the electrical outlet assembly. In this way, attachable hinge elements 98 are attached to the base 12 and/or lid 4 by sliding the hinge elements 98 onto the respective base 12 and/or lid 4. Notches or other restrictive structures can help to hold the attachable sliding hinge elements 98 onto the respective base 12 and/or lid 4 groove 100 once they have been attached. Other styles of slidable attachments 98 and hinge styles are contemplated for use with various embodiments of this fourth approach.

Figure 33:
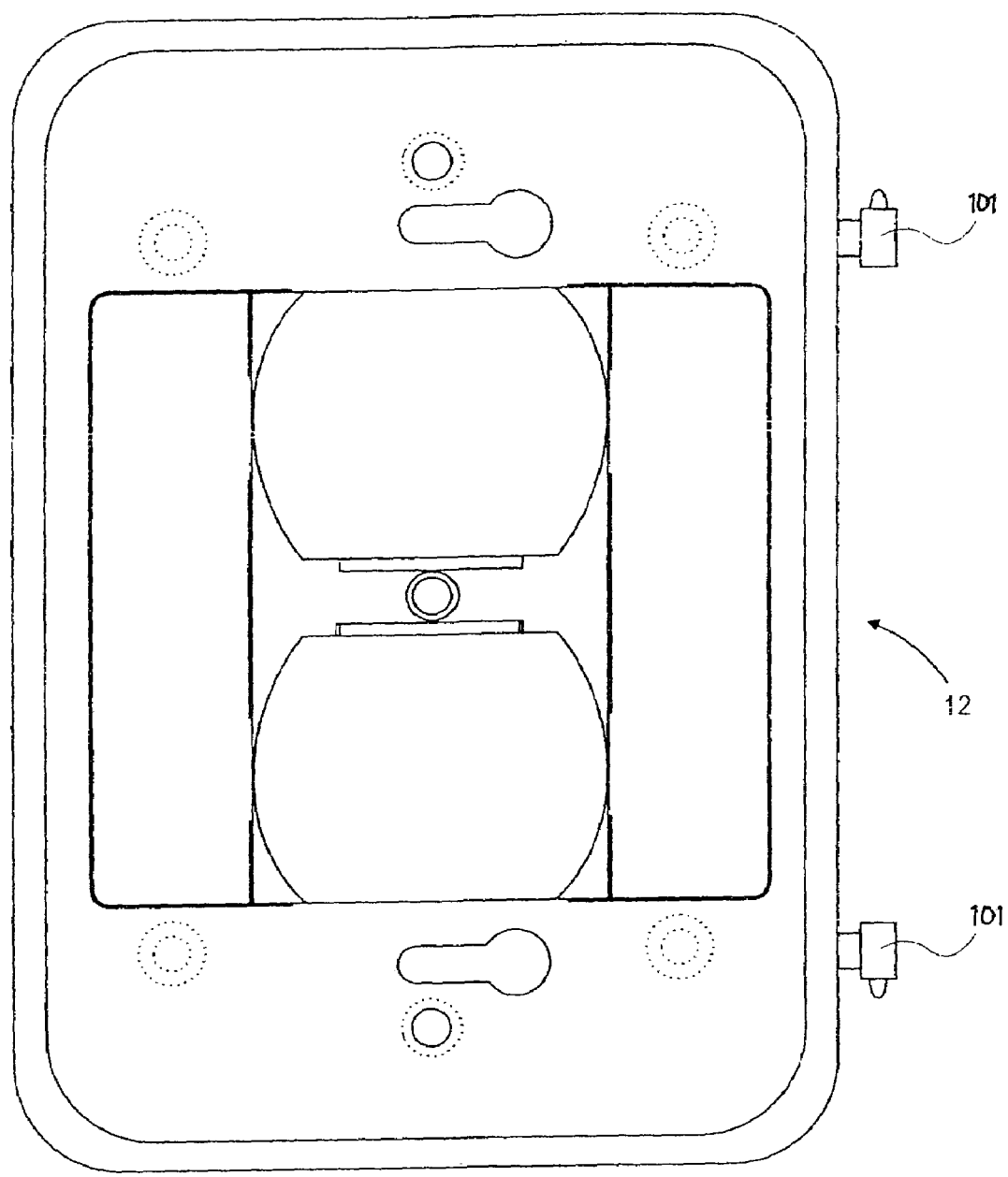
FIG. 33 is a front view of an electrical outlet assembly base having attachable hinge elements attached to the right side of the base configured according to an embodiment of the fourth approach.

FIG. 33 includes two attachable, hinge elements 101 attached to the right side of a base 12. It is contemplated that knock-outs or apertures for placing hinge elements 101 may be provided on any surface of the base 12 or lid 4 that would be beneficial for receiving a hinge element provided the surface has sufficient structural strength to support the operation of the hinge once installed.

Figure 34:
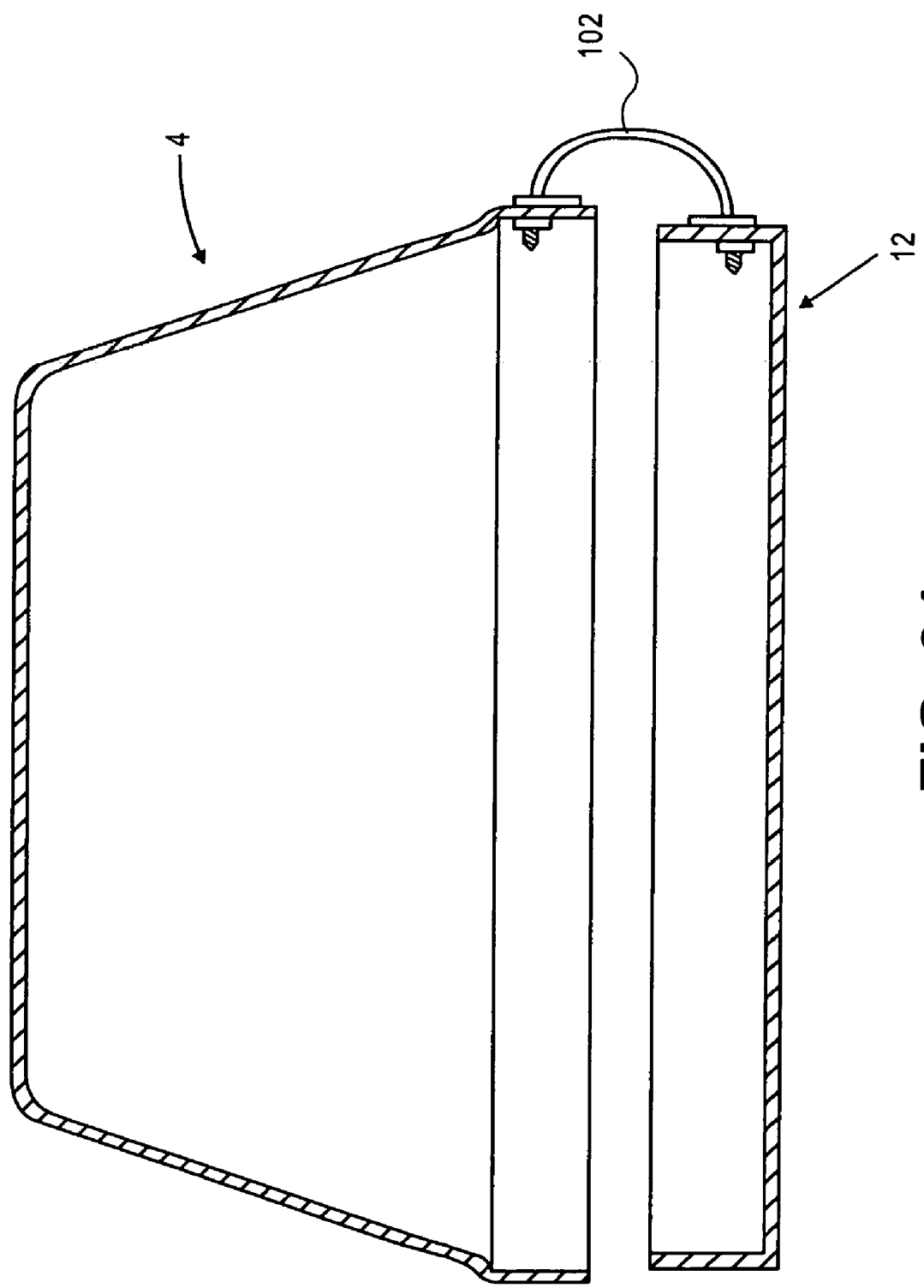
FIG. 34 is a cross sectional right side view of an electrical outlet assembly showing an attachable hinge element attached by screws to both the base and cover configured according to an embodiment of the fourth approach.
Figure 35:
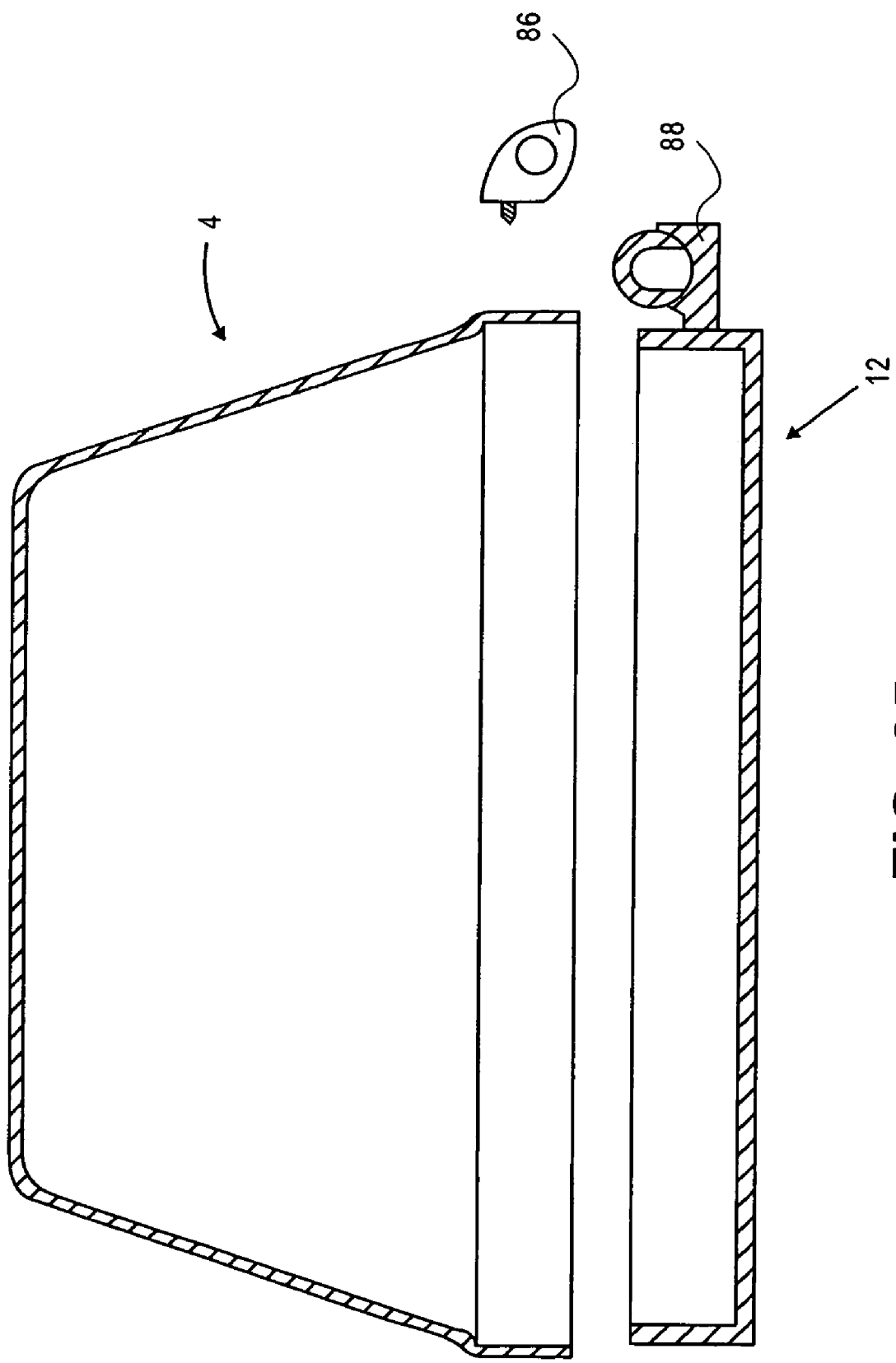
FIG. 35 is a cross sectional right side view of an electrical outlet assembly showing an attachable hinge element for attachment to the cover by a screw configured according to an embodiment of the fourth approach.

FIG. 34 illustrates a hinge element 102 attached to the base 12 and lid 4 of an assembly 2 by screws. As shown in FIG. 35, any hinge style or configuration may be attached using a screw. The particular hinge element attached to the base and lid of FIG. 34 is what is often times referred to as a "living hinge". Examples of living hinge material may be found in U.S. Pat. Nos. 6,559,380, 5,675,126, 5,904,760, the disclosures of which are hereby incorporated herein by reference. A living hinge is a malleable component that flexes to allow bending between two attached pieces. Polypropylene or other thin plastic material is often used. It is contemplated that in many cases, the material used for the living hinge material is the same as is used for the base and/or lid. In one particular example, it is contemplated that the living hinge element will be formed as part of the lid 4 and/or base 12 and will be thereafter attached only to the other respective lid or base by a screw, a snap, prongs, or other attachment mechanism.

Figure 36:
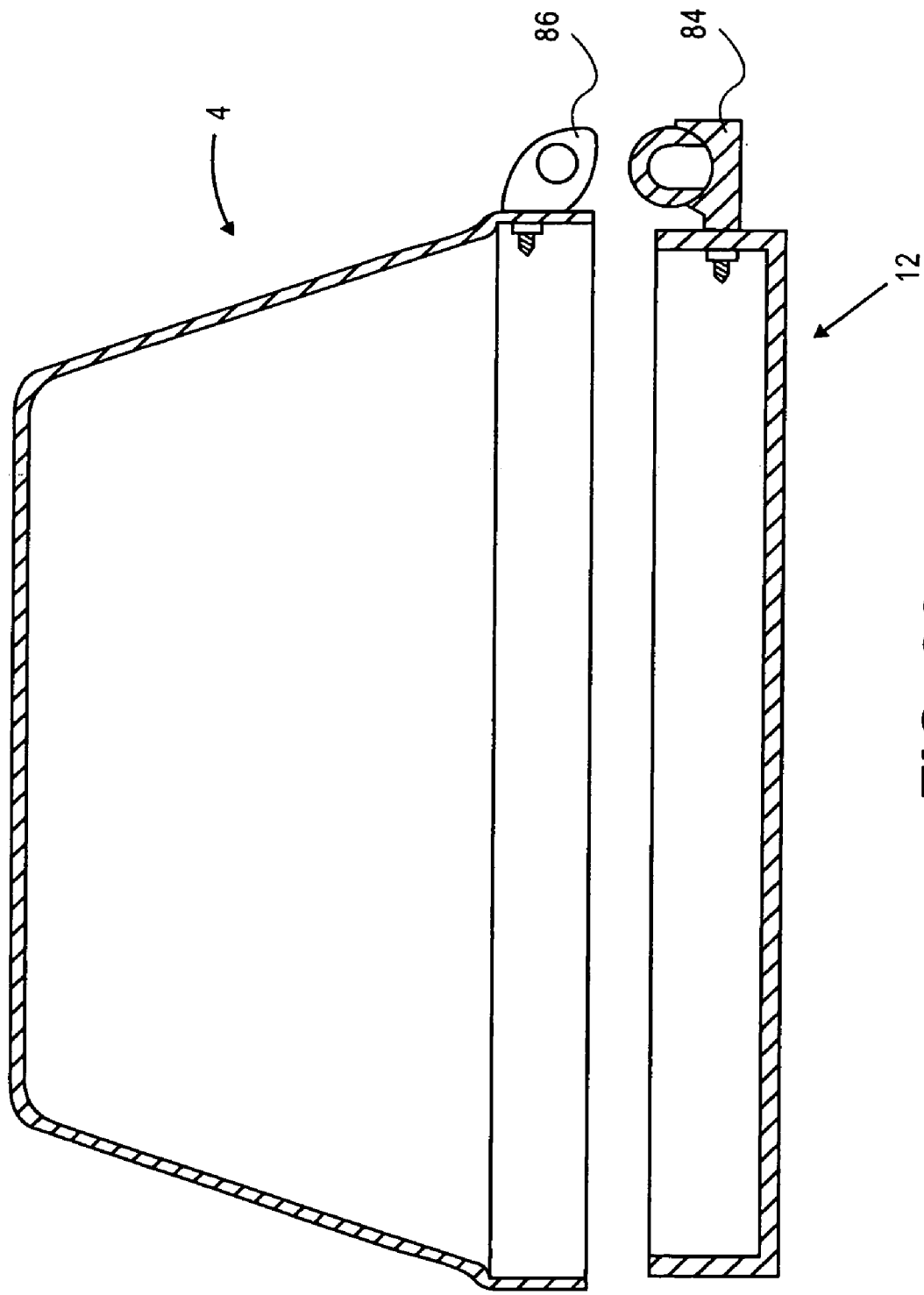
FIG. 36 is a cross sectional right side view of an electrical outlet assembly showing an attachable hinge member attached by bolts and a nut to both the base and cover configured according to an embodiment of the fourth approach.

FIG. 36 shows a particular embodiment of the fourth approach wherein the hinge elements 84 and 86 are attached to the respective base and lid using bolts and a hexagonal nut.

Referring to FIGS. 20–36, an installer can customize the electrical outlet assembly configuration by utilizing the preset installation locations with at least one attachable hinge. The installer can 1) choose from among various preset attachable hinge installation locations; 2) if needed, prepare the preset installation sight such as using a device to remove the knock-out; 3) install the selected attachable hinge element(s) as needed; 4) connect the lid to the base; and 5) cover the electrical outlet. It will be clear from this description and this approach to customizing electrical outlet covers that many combinations of the various styles and components is contemplated and possible. Those of ordinary skill in the art will readily be able to combine these various components to create other useful configurations from the disclosure provided herein.

Many additional embodiments of this fourth approach using attachable hinge members are possible. For example, the attachable hinge elements may be attached onto, rather than through the assembly cover or lid. Furthermore, the preset location for the attachable hinges can be made of material different from the assembly. It should be understood that the attachable hinge examples shown and described herein can be applied to any shape or size of electrical outlet box including but not limited to, weatherproof covers, recessed covers, flat covers, bubble covers and any other electrical outlet covers.

Particular embodiments of the invention are also particularly useful in situations where an optional cover is provided. In such cases, an installer may install the base without any hinge elements at all. Later, hinge members may be added if desired or the base may be used without a lid. If a lid is desired, the hinge elements may be added to the base on an appropriate side and an appropriately configured lid may be attached. It should also be understood that the precise attachment structure used for a particular attachable hinge is not necessarily pertinent for a particular style of electrical outlet box. Various electrical outlet boxes may be adopted for use with various attachable hinge elements.

It is believed that the examples shown for each of the various approaches described herein may be readily adapted to any covered electrical outlet box by those of ordinary skill in the art from the disclosures provided herein. For example, although embodiments of the invention are shown and described with result to electrical outlets, the principles may readily be adapted to use with electrical switches. Furthermore, although embodiments of the invention are shown and described with respect to single-gang electrical devices, double-gang or more electrical device boxes may incorporate the same principles.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. An electrical outlet cover assembly selectively configurable for horizontal and vertical mounting orientations, the cover assembly comprising:
   a base having four sides, the base including at least a first and second base hinge member on a first side of the base and at least a third base hinge member on a second side of the base not adjacent to the first side of the base; and
   a lid having four sides, the lid including at least a first and a second lid hinge member on a first side of the lid respectively configured to mate with the respective first and second base hinge members, and at least a third lid hinge member on a second side of the lid not adjacent to the first side of the lid, the third lid hinge member configured to mate with the third base hinge member;

wherein when the first base hinge member is mated with the first lid hinge member, the lid is configured to pivot about a first axis and when the second and third base hinge members are mated with the second and third lid hinge members respectively, the lid is configured to pivot about a second axis different from and generally perpendicular to the first axis.

2. The electrical outlet cover of claim 1, wherein the first and second base sides are substantially parallel to one another and the first and second lid sides are substantially parallel to one another.

3. The electrical outlet cover of claim 1, wherein the at least a first base hinge member comprises at least two base hinge members and the at least a first lid hinge member comprises at least two lid hinge members.

4. The electrical outlet cover of claim 1, wherein the second axis is generally parallel to a third side of the four sides of the base.

5. The electrical outlet cover of claim 1, wherein the first axis is generally parallel to the first side of the base.

6. The electrical outlet cover of claim 1, wherein the first and second sides of the base and lid respectively are short sides of a single gang outlet cover and a third side of the four sides of the base and lid respectively that extends between the first and second sides of the base and lid respectively is a long side of the single gang outlet cover.

7. The electrical outlet cover of claim 1, wherein the first and second sides of the base and lid respectively are long sides of a single gang outlet cover and a third side of the four sides of the base and lid respectively that extends between the first and second sides of the base and lid respectively is a short side of the single gang outlet cover.

8. An electrical outlet cover assembly selectively configurable for horizontal and vertical mounting orientations, the cover assembly comprising:
   a base having first and second base sides substantially parallel to each other and not adjacent to each other, and a third base side substantially orthogonal to both the first and second base sides, the base comprising hinge members only on non-adjacent base sides;
   a lid having first and second lid sides substantially parallel to each other and not adjacent to each other, and a third base side substantially orthogonal to both the first and second lid sides, the lid comprising hinge members only on non-adjacent lid sides;
   wherein the respective base and lid hinge members form at least two attachable hinge sets comprising a first set including a first hinge member coupled to the lid and a second hinge member coupled to the base and configured to mate with the first hinge member, and a second set including a third hinge member coupled to the lid and a fourth hinge member coupled to the base and configured to mate with the third hinge member;
   wherein when the first hinge set is attached, the lid pivots about a first axis substantially parallel with the first base side, and when the second hinge set is attached, the lid pivots about a second axis substantially parallel with the third base side.

9. The electrical outlet cover of claim 8, wherein the first hinge member of the first hinge set comprises at least two hinge members and the second hinge member of the first hinge set comprises at least two hinge members.

10. The electrical outlet cover of claim 8, wherein the third hinge member of the second hinge set comprises at least two hinge members and the fourth hinge member of the second hinge set comprises at least two hinge members.

11. The electrical outlet cover of claim 8, wherein the first and second base sides are short sides of a single gang outlet base and the third base side is a long side of the single gang outlet base.

12. The electrical outlet cover of claim 8, wherein the first and second base sides are long sides of a single gang outlet cover and the third base side is a short side of the single gang outlet base.

13. A method of converting an electrical outlet cover assembly between horizontal and vertical orientation mounting configurations, the method comprising:
   pivoting a lid about a first axis substantially parallel to a first side of a base to which the lid is attached through a first mating set of hinges;
   detaching the first mating set of hinges and attaching the lid to the base through a second mating set of hinges different from the first set, wherein the second hinge set comprises first and second hinge pairs, each pair including a lid hinge member and a base hinge member, and wherein the lid and base hinge members of the first hinge pair are on non-adjacent sides of the respective lid and base from the respective lid and base members of the second hinge pair;
   pivoting the lid about a second axis substantially orthogonal to the first axis when the lid is attached to the base through the second hinge set.

14. The method of claim 13, wherein the first and second hinge sets are on substantially parallel sides of the respective lid and base.

15. The method of claim 13, wherein the first hinge set is on the first side of the respective lid and base.

16. The method of claim 13, wherein the second hinge set is on the first side of the respective lid and base.

17. The method of claim 13, wherein the first hinge set includes components on each of the first and a second side substantially parallel to the first side of the respective lid and base.

18. The method of claim 13, wherein the second hinge set includes components on each of the first and a second side substantially parallel to the first side of the respective lid and base.

19. The method of claim 13, wherein the outlet cover is a single gang outlet cover having long and short sides, and wherein the first side is the short side of the base.

20. The electrical outlet cover of claim 13, wherein the outlet cover is a single gang outlet cover having long and short sides, and wherein the first side is the long side of the base.

* * * * *

UNITED STATES PATENT AND TRADEMARK OFFICE
CERTIFICATE OF CORRECTION

PATENT NO. : 7,071,415 B1  Page 1 of 1
APPLICATION NO. : 11/062030
DATED : July 4, 2006
INVENTOR(S) : Michael J. Shotey et al.

It is certified that error appears in the above-identified patent and that said Letters Patent is hereby corrected as shown below:

Column 15:
Please replace claim 8 with the following language for claim 8:

8. An electrical outlet cover assembly selectively configurable for horizontal and vertical mounting orientations, the cover comprising:

a base having first and second base sides substantially parallel to each other and not adjacent to each other, and a third base side substantially orthogonal to both the first and second base sides, the base comprising hinge members only on non-adjacent base sides;

a lid having first and second lid sides substantially parallel to each other and not adjacent to each other, and a third lid side substantially orthogonal to both the first and second lid sides, the lid comprising hinge members only on non-adjacent lid sides;

wherein the respective base and lid hinge members form at least two attachable hinge sets comprising a first set including a first hinge member coupled to the lid and a second hinge member coupled to the base and configured to mate with the first hinge member, and a second set including a third hinge member coupled to the lid and a fourth hinge member coupled to the base and configured to mate with the third hinge member;

wherein when the first hinge set is attached, the lid pivots about a first axis substantially parallel with the first base side, and when the second hinge set is attached, the lid pivots about a second axis substantially parallel with the third base side.

Signed and Sealed this

Twenty-seventh Day of July, 2010

David J. Kappos
*Director of the United States Patent and Trademark Office*

UNITED STATES PATENT AND TRADEMARK OFFICE
CERTIFICATE OF CORRECTION

PATENT NO.         : 7,071,415 B1
APPLICATION NO.    : 11/062030
DATED              : July 4, 2006
INVENTOR(S)        : Michael J. Shotey et al.

It is certified that error appears in the above-identified patent and that said Letters Patent is hereby corrected as shown below:

Column 15, lines 35-60:
Please replace claim 8 with the following language for claim 8:

8. An electrical outlet cover assembly selectively configurable for horizontal and vertical mounting orientations, the cover comprising:

a base having first and second base sides substantially parallel to each other and not adjacent to each other, and a third base side substantially orthogonal to both the first and second base sides, the base comprising hinge members only on non-adjacent base sides;

a lid having first and second lid sides substantially parallel to each other and not adjacent to each other, and a third lid side substantially orthogonal to both the first and second lid sides, the lid comprising hinge members only on non-adjacent lid sides;

wherein the respective base and lid hinge members form at least two attachable hinge sets comprising a first set including a first hinge member coupled to the lid and a second hinge member coupled to the base and configured to mate with the first hinge member, and a second set including a third hinge member coupled to the lid and a fourth hinge member coupled to the base and configured to mate with the third hinge member;

wherein when the first hinge set is attached, the lid pivots about a first axis substantially parallel with the first base side, and when the second hinge set is attached, the lid pivots about a second axis substantially parallel with the third base side.

This certificate supersedes the Certificate of Correction issued July 27, 2010.

Signed and Sealed this

Twenty-fourth Day of August, 2010

David J. Kappos
*Director of the United States Patent and Trademark Office*